(12) United States Patent
Kikuchi et al.

(10) Patent No.: US 7,949,885 B2
(45) Date of Patent: May 24, 2011

(54) POWER SUPPLY DEVICE, IMAGE FORMING APPARATUS, AND POWER SUPPLY METHOD

(75) Inventors: Hideo Kikuchi, Kanagawa (JP); Naoki Sato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 645 days.

(21) Appl. No.: 11/959,991

(22) Filed: Dec. 19, 2007

(65) Prior Publication Data

US 2008/0155294 A1 Jun. 26, 2008

(30) Foreign Application Priority Data

Dec. 22, 2006 (JP) ................................ 2006-346279
Nov. 12, 2007 (JP) ................................ 2007-293395

(51) Int. Cl.
*G06F 1/26* (2006.01)
(52) U.S. Cl. ............ 713/300; 713/320; 399/37; 399/88; 399/89; 399/90
(58) Field of Classification Search .................. 713/300; 399/37, 88, 89, 90
See application file for complete search history.

(56) References Cited

U.S. PATENT DOCUMENTS

| | | | | |
|---|---|---|---|---|
| 4,884,022 A | * | 11/1989 | Bishop | ........................... 324/157 |
| 5,794,554 A | * | 8/1998 | Akahane et al. | ......... 112/470.01 |
| 5,939,799 A | * | 8/1999 | Weinstein | ........................ 307/64 |
| 6,697,955 B1 | * | 2/2004 | Malik et al. | .................... 713/340 |
| 6,894,405 B2 | * | 5/2005 | Yuan | ............................... 307/45 |
| 7,071,668 B2 | * | 7/2006 | Sasaki | ........................... 323/290 |
| 7,289,741 B2 | | 10/2007 | Kikuchi | |
| 7,295,787 B2 | | 11/2007 | Kikuchi | |
| 2004/0153759 A1 | * | 8/2004 | Motegi | ............................ 714/14 |
| 2005/0095017 A1 | | 5/2005 | Kikuchi | |
| 2006/0034627 A1 | | 2/2006 | Kikuchi et al. | |
| 2006/0055767 A1 | | 3/2006 | Mochimaru et al. | |
| 2006/0062583 A1 | | 3/2006 | Kikuchi | |
| 2006/0165422 A1 | | 7/2006 | Kikuchi et al. | |
| 2007/0059016 A1 | | 3/2007 | Sato et al. | |
| 2007/0212103 A1 | | 9/2007 | Kikuchi | |

FOREIGN PATENT DOCUMENTS

| | | |
|---|---|---|
| JP | 2001-42707 | 2/2001 |
| JP | 2005-148581 | 6/2005 |

* cited by examiner

*Primary Examiner* — Nitin C Patel
(74) *Attorney, Agent, or Firm* — Oblon, Spivak, McClelland, Maier & Neustadt, L.L.P.

(57) ABSTRACT

A power supply device supplies power to an image forming apparatus. The image forming apparatus includes a load and a control unit. The load requires power, and is controlled by the control unit. The power supply includes a capacitor and a power-supply unit. The capacitor is charged by an external power source, and dischargably stores therein power. The power-supply unit provides power supply from the capacitor to the load and the control unit before voltage of the external power source drops below a threshold level where malfunction of the image forming apparatus occurs. After the voltage recovers to the threshold level, the power-supply unit stops the power supply from the capacitor.

14 Claims, 18 Drawing Sheets

POWER SUPPLY DEVICE, IMAGE FORMING APPARATUS, AND POWER SUPPLY METHOD

CROSS-REFERENCE TO RELATED APPLICATIONS

The present application claims priority to and incorporates by reference the entire contents of Japanese priority documents, 2006-346279 filed in Japan on Dec. 22, 2006 and 2007-293395 filed in Japan on Nov. 12, 2007.

BACKGROUND OF THE INVENTION

1. Field of the Invention

The present invention relates to an image forming apparatus and a power supply method for the same.

2. Description of the Related Art

Recent advances in technology have provided image forming apparatuses with a wide range of features comparable to personal computers. For example, image forming apparatuses can now print data received from other apparatuses via a network, or even store the data therein. However, if a power cut occurs (i.e., commercial power supply is interrupted) while an image forming apparatus is receiving data, the data may be lost. Besides, if a power cut occurs while an image forming apparatus is in the process of forming an image, driving mechanisms become out of control and may be damaged.

Japanese Patent Application Laid-open No. 2005-148581 discloses a conventional image forming apparatus that includes a power-cut detecting circuit and an auxiliary power supply. The auxiliary power supply basically supplements power supplied to a fixing heater. However, when the power-cut detecting circuit detects a power cut, the auxiliary power supply supplies power to each unit of the image forming apparatus under control of its control unit.

In the conventional image forming apparatus, however, because the control unit itself requires power supply to operate, it can not operate when there is power cut. Consequently, there is a need to prepare a power supply unit that is capable of supplying power, at least for a predetermined time, after a power cut occurs, resulting in structural complexity of the power supply unit. Moreover, if the auxiliary power supply fails to supply power in time, power supply becomes unstable, which causes data loss, damages to driving mechanisms, and the like.

SUMMARY OF THE INVENTION

It is an object of the present invention to at least partially solve the problems in the conventional technology.

According to an aspect of the present invention, there is provided an image forming apparatus that includes a capacitor that is charged by an external power source, and dischargably stores therein power; a load that requires power; a control unit that controls the load; and a power-supply unit that causes the capacitor to supply power to the load and the control unit before a voltage of the external power source drops below a threshold level where malfunction of any one of the load and the control unit occurs, and stops the supply of power from the capacitor to the load and the control unit after the voltage rises to the threshold level.

According to another aspect of the present invention, there is provided a power supply device for an apparatus including a load that requires power and a control unit that controls the load. The power supply device includes a capacitor that is charged by an external power source, and dischargably stores therein power; and a power-supply unit that causes the capacitor to supply power to the load and the control unit before a voltage of the external power source drops below a threshold level where malfunction of the apparatus occurs, and stops the supply of power from the capacitor to the load and the control unit after the voltage rises to the threshold level.

According to still another aspect of the present invention, there is provided a power supply method of supplying power to an apparatus, the apparatus including a load requiring power and a control unit that controls the load. The power supply method includes charging a capacitor by an external power source; providing power supply from the capacitor to the load and the control unit before voltage of the external power source drops below a threshold level where malfunction of the apparatus occurs; and stopping the power supply from the capacitor after the voltage has risen to the threshold level.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
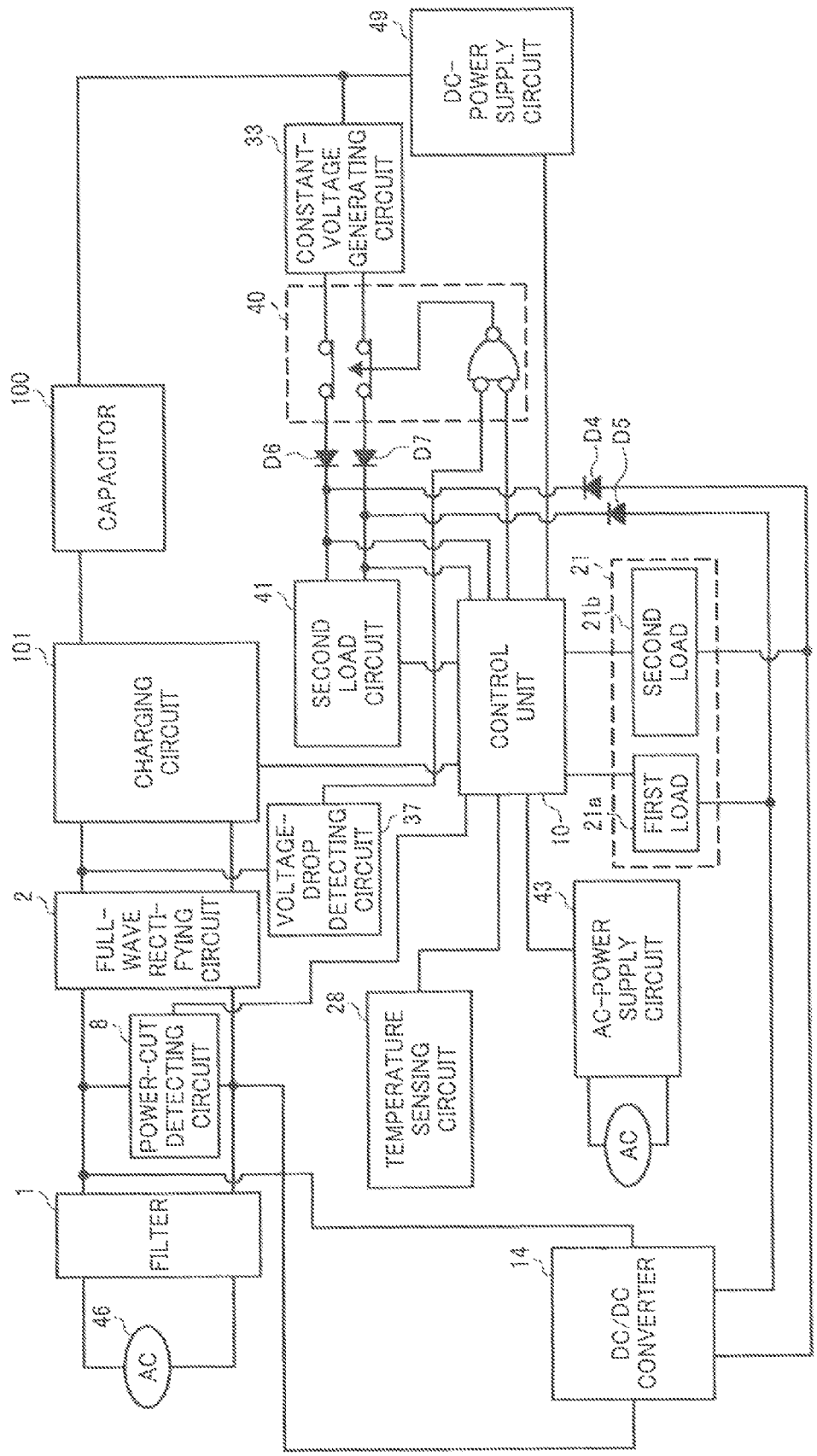
FIG. 1 is a schematic diagram of a power-supply unit according to a first embodiment of the present invention.

FIG. 1 is a schematic diagram of a power-supply unit according to a first embodiment of the present invention. A case where the power-supply unit shown in FIG. 1 is used in an image forming apparatus is explained below; however, the power-supply unit can be used in devices other than image forming apparatuses with some or no modification. The power-supply unit detects a voltage drop and an interruption, both temporary and sustained, in commercial power supply, and switches power sources.

The power-supply unit includes a main power switch 11, a filter 1, a power-cut detecting circuit 8, a full-wave rectifying circuit 2, a charging circuit 101, a capacitor 100, a constant-voltage generating circuit 33, a switching circuit 40, a control unit 10, a voltage-drop detecting circuit 37, a direct-current-to-direct-current (DC/DC) converter 14, a first load circuit 21, a second load circuit 41, a DC-power supply circuit 49, a temperature sensing circuit 28, and an alternating current (AC)-power supply circuit 43.

Figure 2:
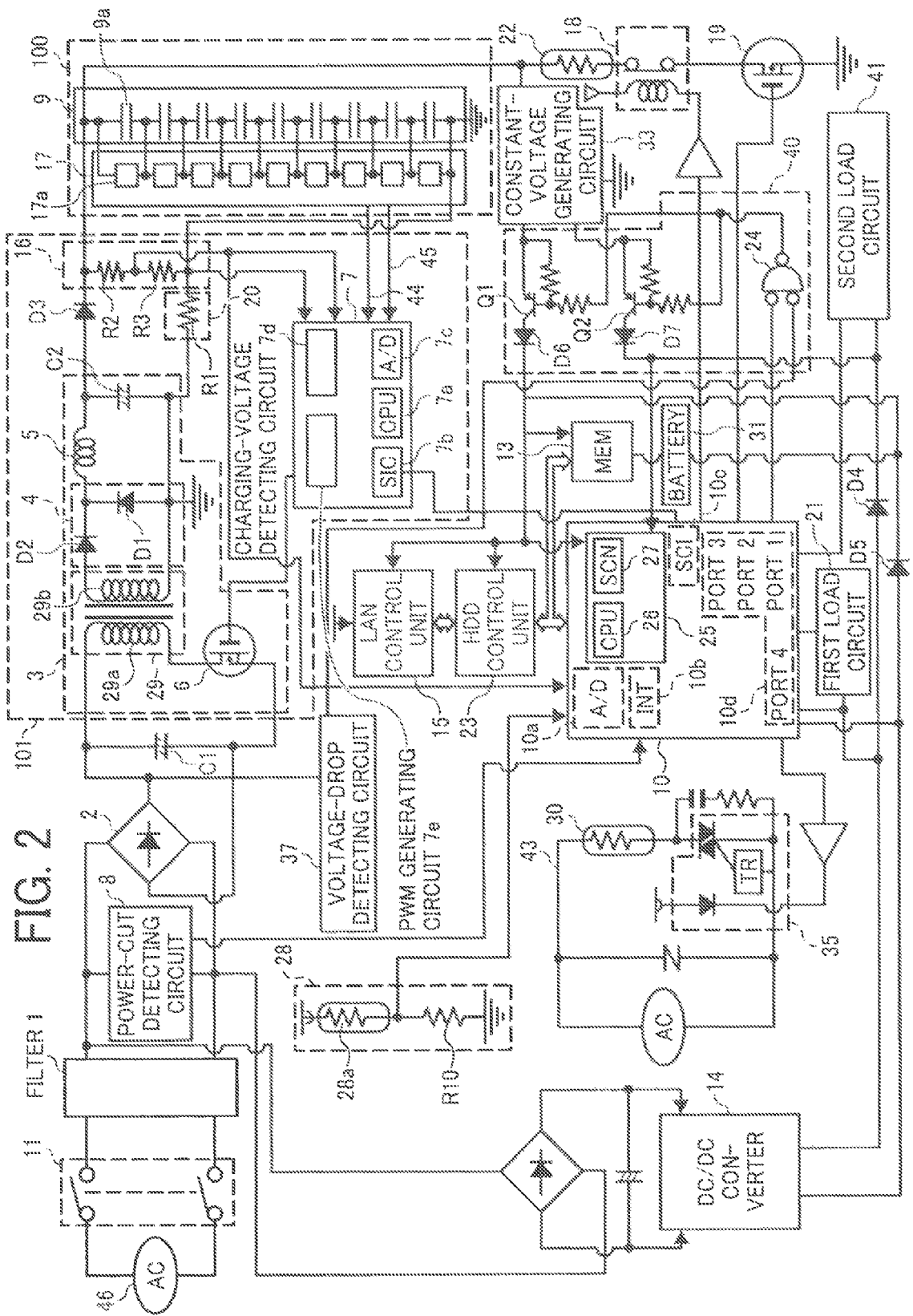
FIG. 2 is detailed circuitry of the power-supply unit shown in FIG. 1.

FIG. 2 is detailed circuitry of the power-supply unit. The DC-power supply circuit 49 includes a DC fixing heater 22, a relay 18, and a field effect transistor (FET) as a discharging circuit 19. The control unit 10 includes an analog-to-digital (A/D) converter 10a, an interrupt control circuit (INT) 10b, and a specific circuit 25. The second load circuit 41 is supplied with power at the time of interruption of power from a commercial power supply 46. The second load circuit 41 includes a local area network (LAN) control unit 15, a hard disk drive (HDD) control unit 23, a memory (MEM) 13, and the specific circuit 25 of the control unit 10. The capacitor 100 includes a capacitor bank 9.

The charging circuit 101 includes a variable-voltage generating circuit 3, a variable-voltage regulator circuit 7, a charging-voltage detecting circuit 16, a charging-current detecting circuit 20. The variable-voltage generating circuit 3 generates output voltage. The variable-voltage regulator circuit 7 regulates the output voltage of the variable-voltage generating circuit 3. The charging-voltage detecting circuit 16 detects the charging voltage of the capacitor bank 9. The charging-current detecting circuit 20 detects the charging current of the capacitor bank 9. The voltage detected by the charging-voltage detecting circuit 16 and the current detected by the charging-current detecting circuit 20 are fed back to the variable-voltage regulator circuit 7.

The variable-voltage regulator circuit 7 includes a central processing unit (CPU) 7a, a serial controller (SIC) 7b, an A/D converter 7c, a charging-voltage detecting circuit 7d, and a pulse width modulation (PWM) generating circuit 7e. Although not shown, the variable-voltage regulator circuit 7 further includes a read only memory (ROM), a random access memory (RAM), a timer, an interrupt control circuit, and an input/output (I/O) port. The PWM generating circuit 7e is connected to the CPU 7a via an internal bus, and generates a PWM signal for constant-voltage output, constant-current charging, and constant-power charging.

Described below is how the capacitor bank 9 is charged. First, AC power supplied via the main power switch 11 from the commercial power supply 46 is fed to the full-wave rectifying circuit 2 through the filter 1. The full-wave rectifying circuit 2 converts the AC power to a full-wave rectified output. A smoothing capacitor C1 smoothes the rectified output to minimize ripple.

The full-wave rectifying circuit 2 is connected, on its output side, to a primary coil 29a of a high-frequency transformer 29. The primary coil 29a is in parallel with the smoothing capacitor C1, and is connected in series to an FET 6 that constitutes a switching circuit.

The switching circuit, i.e., the FET 6, operates based on a PWM signal output from the PWM generating circuit 7e. When the FET 6 is switched, a switching current flows through the primary coil 29a. The switching current flowing through the primary coil 29a induces a switching voltage in a secondary coil 29b of the high-frequency transformer 29. By controlling a period during which the switching current conducts through the primary coil 29a, the switching voltage output from the secondary coil 29b can be controlled.

The secondary coil 29b is connected to diodes D1 and D2 as a rectifying circuit 4. The switching voltage is rectified by the rectifying circuit 4, and smoothed by a choke coil 5 and a capacitor C2, thereby being converted to DC output. The DC output is supplied through a diode D3 to the capacitor bank 9.

The capacitor bank 9 includes 18 capacitor cells 9a (electric double-layer capacitor cells) that are connected in series. Each of the capacitor cells 9a can be charged up to 2.5 volts. When each of the capacitor cells 9a is charged to its full capacity, a total voltage of 45 volts is stored in the capacitor 100. The cell structure is such that the capacity of the capacitor bank 9 (the capacitor 100) is sufficient to prevent temperature drop during serial copying by the image forming apparatus as well as to achieve the required short warm-up period of a fixing device.

The charging-voltage detecting circuit 16 includes resistors R2 and R3 that constitute a voltage-divider circuit, and detects the voltage across the capacitor bank 9. The charging-voltage detecting circuit 16 outputs a detection result to the A/D converter 7c and the A/D converter 10a.

The PWM generating circuit 7e monitors the output voltage of the variable-voltage generating circuit 3, and regulates it by controlling the on-period (on-duty) of a PWM signal.

A resistor R1 is connected in series to the capacitor bank 9, and the charging-current detecting circuit 20 detects the voltage across the capacitor bank 9 by monitoring the current flowing in the resistor R1. A detection result is output to the charging-voltage detecting circuit 7d.

The capacitor bank 9 is connected to an equalizing circuit 17. The equalizing circuit 17 includes bypass circuits 17a that are connected in parallel with the capacitor cells 9a. The equalizing circuit 17 equalizes the charging voltage across the individual capacitor cells 9a using the bypass circuits 17a. Specifically, when first one of the capacitor cells 9a is charged to its full capacity, i.e., 2.5 volts, by the variable-voltage generating circuit 3, corresponding one of the bypass circuits 17a bypasses the first one, i.e., charges second one of the capacitor cells 9a without charging the first one. The other bypass circuits 17a operate in the same manner as above, thereby equalizing the charging voltage of the capacitor cells 9a.

Upon detecting that any one of the capacitor cells 9a is fully charged, the equalizing circuit 17 brings corresponding one of the bypass circuits 17a into operation, and outputs a single-cell full-load signal 44 to the PWM generating circuit 7e. Upon detecting that all the capacitor cells 9a are fully charged, the equalizing circuit 17 brings all the bypass circuits 17a into operation, and outputs an all-cell full-load signal 45 to the PWM generating circuit 7e.

Based on the detection results, i.e., the charging voltage and the charging current of the capacitor bank 9 and the operation of the equalizing circuit 17, the PWM generating circuit 7e generates a PWM signal for charging the capacitor bank 9 with constant current, constant power, and constant voltage.

The PWM generating circuit 7e detects the voltage across the capacitor bank 9 from the output of the charging-voltage detecting circuit 16. When the voltage across the capacitor bank 9 is lower than a preset value, the PWM generating circuit 7e successively detects the voltage across the resistor R1 connected in series to the capacitor bank 9. The PWM generating circuit 7e then outputs a PWM signal corresponding to the detected voltage to a gate of the FET 6 for charging the capacitor bank 9 with preset constant current. Such a PWM signal can be generated with reference to a pre-created table defining relation between the voltage across the resistor R1 and the on-period (on-duty) of the PWM signal, or can be calculated. A PWM signal can be controlled by referring only to the charging current of the capacitor bank 9 such that the capacitor bank 9 is charged with preset current.

If the capacitor bank 9 is not charged, a PWM signal can be controlled such that the output voltage of the variable-voltage generating circuit 3 is first set to low and is gradually increased to prevent a high inrush current from flowing into the capacitor bank 9.

When the voltage across the capacitor bank 9 rises to a value equal to or higher than the preset value, the PWM generating circuit 7e successively detects the charging current of the capacitor bank 9 and the voltage across the capacitor bank 9. Based on the detected charging current and voltage, the PWM generating circuit 7e outputs a PWM signal to the gate of the FET 6 for charging the capacitor bank 9 with preset constant power. Such a PWM signal is calculated based on the detected charging current and voltage.

Upon detecting the single-cell full-load signal 44, the PWM generating circuit 7e outputs a PWM signal to the gate of the FET 6 for charging again the capacitor bank 9 with the preset constant current. On the other hand, upon detecting the all-cell full-load signal 45, the PWM generating circuit 7e outputs a PWM signal for charging the capacitor bank 9 to a constant voltage during a predetermined period, and then outputs a signal for stopping the charging operation to the gate of the FET 6.

Even if the charging voltage detected by the charging-voltage detecting circuit 16 reaches or exceeds the full-capacity of the capacitor bank 9 (in the first embodiment, 2.5 volts×18=45 volts), the PWM generating circuit 7e charges the capacitor bank 9 to a constant voltage unless detecting the single-cell full-load signal 44 or the all-cell full-load signal 45. When, after start of the constant-voltage charging, the charging-voltage detecting circuit 16 detects an increase in the charging voltage, the PWM generating circuit 7e outputs a signal for stopping the charging operation. When, after the stop of the charging operation, the charging voltage further increases, an abnormal voltage-increase detecting circuit (not shown) interrupts the charging operation. In this case, re-charging is not allowed.

The control unit 10 is described in detail below. The control unit 10 includes a main control unit, an engine control unit, an operation control unit, a read-control unit, and a write-control unit. The main control unit controls the image forming apparatus. The engine control unit controls the operation to form an image. The operation control unit controls the receipt of input such as settings or parameters specified by a user though a touch panel, etc., and display of such information. The read-control unit controls optical reading of image data. The write-control unit controls writing of the image data to a photosensitive drum.

As described above, the control unit 10 includes the specific circuit 25 that is supplied with power at the time of interruption of power from the commercial power supply 46. The specific circuit 25 includes a CPU 26 and a scanner control circuit (SCN) 27. The CPU 26 is connected via an internal bus to the A/D converter 10a, the interrupt control circuit 10b, a serial controller (SIC) 10c, and I/O ports 10d. The CPU 26 is also connected via an internal bus to a non-volatile RAM (NVRAM), a ROM, a RAM, a timer, and the like, which are not shown in the drawings.

The LAN control unit 15 and the HDD control unit 23 are also supplied with power at the time of interruption of power from the commercial power supply 46. The LAN control unit 15 is a communication interface board for an in-house LAN and controllers, and includes a physical layer (PHY) chip. The LAN control unit 15 is connected to the controllers via a standard communication interface. The image forming apparatus communicates with an external device through the LAN control unit 15. If a power cut occurs during communication with an external device via the LAN control unit 15, the capacitor 100 supplies power to the LAN control unit 15 until the communication is completed to prevent data loss due to an interruption of the communication.

The HDD control unit 23 functions as an application database that stores therein an application program, information for invoking a printer and an image forming processor, and the like. The HDD control unit 23 also functions as an image database that stores therein image data including scanned image data, image data written thereto, and text data. If a power cut occurs while such data is being stored in an HDD, the capacitor 100 also supplies power to the HDD control unit 23 until necessary data is stored in the HDD to prevent data loss.

The memory 13 can store therein data even at the time of power-OFF with the backup of a battery 31. During a power cut, the capacitor 100 supplies power to the memory 13 such that necessary data being executed is stored in the memory 13 and read therefrom after recovery from the power cut.

As peripheral circuits of the control unit 10, the power-supply unit includes, in addition to the DC fixing heater 22 as an auxiliary heater, an AC fixing heater 30 for heating a fixing device 111 (described later). The AC-power supply circuit 43 supplies power to the AC fixing heater 30, while the DC-power supply circuit 49 supplies power to the DC fixing heater 22. The temperature sensing circuit 28 is connected to the I/O ports 10d to detect a surface temperature (fixing temperature) of a fixing roller 121 (described later). The temperature sensing circuit 28 includes a resistor R10 connected in series to a thermistor 28a. The temperature sensing circuit 28 detects a temperature of a region corresponding to the AC fixing heater 30 and the DC fixing heater 22. The DC fixing heater 22 is used as an auxiliary heater to cope with a temperature drop during serial copying or while the fixing device is warming up, and is located inside the fixing device 111.

The I/O ports 10d includes first to fourth ports, and is connected to the relay 18, the discharging circuit 19, the AC-power supply circuit 43, an AND circuit 24, and the second load circuit 41. The I/O ports 10d is also connected to the first load circuit 21. The first load circuit 21 includes a first load 21a and a second load 21b that needs high power. Examples of the first load circuit 21 include a motor, a solenoid, a clutch, a switching circuit, and a sensor necessary to form an image. Based on a detection result obtained by the temperature sensing circuit 28, the relay 18 and the discharging circuit 19 supplies the DC fixing heater 22 with power stored in the capacitor bank 9. Based on a detection result obtained by the temperature sensing circuit 28, the AC-power supply circuit 43 supplies the AC fixing heater 30 with power stored in the capacitor bank 9. The AND circuit 24 is connected to the first port that outputs a signal for supplying the second load circuit 41 with power stored in the capacitor bank 9.

When the main power switch 11 is ON or during regular copy operation, the AC-power supply circuit 43 supplies the AC fixing heater 30 with power to fix an image. If the temperature sensing circuit 28 detects that the temperature is equal to or lower than a predetermined value, the CPU 26 outputs a signal to turn on a triac to a phototriac drive circuit 35 through the fourth port of the I/O ports 10d. As a result, power is supplied to the AC fixing heater 30.

If the temperature sensing circuit 28 detects that the temperature has exceeded the predetermined value, the CPU 26 outputs a signal to turn off the triac to the phototriac drive circuit 35 through the fourth port. As a result, power supply to the AC fixing heater 30 is stopped.

When the main power switch 11 is turned on, the CPU 26 checks the charging voltage detected by the charging-voltage detecting circuit 16. The CPU 26 then outputs a signal to turn on the relay 18 through the third port of the I/O port 10d. Thereafter, the CPU 26 outputs a signal to turn on the discharging circuit 19 through the second port of the I/O port 10d. As a result, the DC fixing heater 22 is supplied with power stored in the capacitor bank 9.

If the temperature sensing circuit 28 detects that the temperature is higher than the predetermined value, the CPU 26 outputs a signal to turn off the discharging circuit 19 through the second port. As a result, power supply to the DC fixing heater 22 is stopped. To control the fixing temperature, the CPU 26 controls ON and OFF of only the discharging circuit 19 while leaving the relay 18 to stay ON.

If the temperature sensing circuit 28 detects that the temperature drops to a level where an image may remain unfixed during serial copying, the CPU 26 checks the all-cell full-load signal 45 from the variable-voltage regulator circuit 7 or the charging voltage detected by the charging-voltage detecting circuit 16. The CPU 26 then outputs a signal to turn on the discharging circuit 19 through the second port of the I/O port 10d. With this, the relay 18 is closed, and the DC fixing heater 22 is supplied with power stored in the capacitor bank 9.

Described below is the operation to supply power from the capacitor 100 to the second load circuit 41. The power-cut detecting circuit 8 detects that the voltage of the commercial power supply 46 drops due to a power cut, and that the DC/DC converter 14, which generates a preset constant voltage, is not able to generate the constant voltage. As shown in FIGS. 1 and 2, the power-cut detecting circuit 8 detects a power cut by monitoring the output of the full-wave rectifying circuit 2, i.e., a full-wave rectified voltage converted from the voltage of the commercial power supply 46 by the full-wave rectifying circuit 2. The power-cut detecting circuit 8 can be arranged between the DC/DC converter 14 and diodes D4 and D5. In this case, the power-cut detecting circuit 8 detects a power cut by monitoring the constant voltage output from the DC/DC converter 14. The power-supply unit need not include the power-cut detecting circuit 8 if dealing with only temporary interruptions of power supply from the commercial power supply 46.

In the first embodiment, a zero-cross signal generating circuit and a zero-cross signal detecting circuit are used to detect a power cut. While the commercial power supply 46 supplies power normally, a zero-cross signal is input to the interrupt control circuit 10b. For example, when the commercial power supply 46 supplies power at a frequency of 50 hertz, an interrupt occurs every 10 milliseconds. If a power cut occurs or the voltage of the commercial power supply 46 drops, no zero-cross signal is input to the interrupt control circuit 10b. Accordingly, no interrupt occurs.

A photocoupler is used as the zero-cross signal generating circuit. As AC voltage rises, current flows through a resistor into a photodiode of the photocoupler, and a phototransistor of the photocoupler is turned on.

As AC voltage drops, the current flowing through the photodiode decreases, which turns off the phototransistor. In response thereto, the zero-cross signal generating circuit generates a zero-cross signal synchronously when the voltage of the commercial power supply 46 becomes zero.

Figure 3:
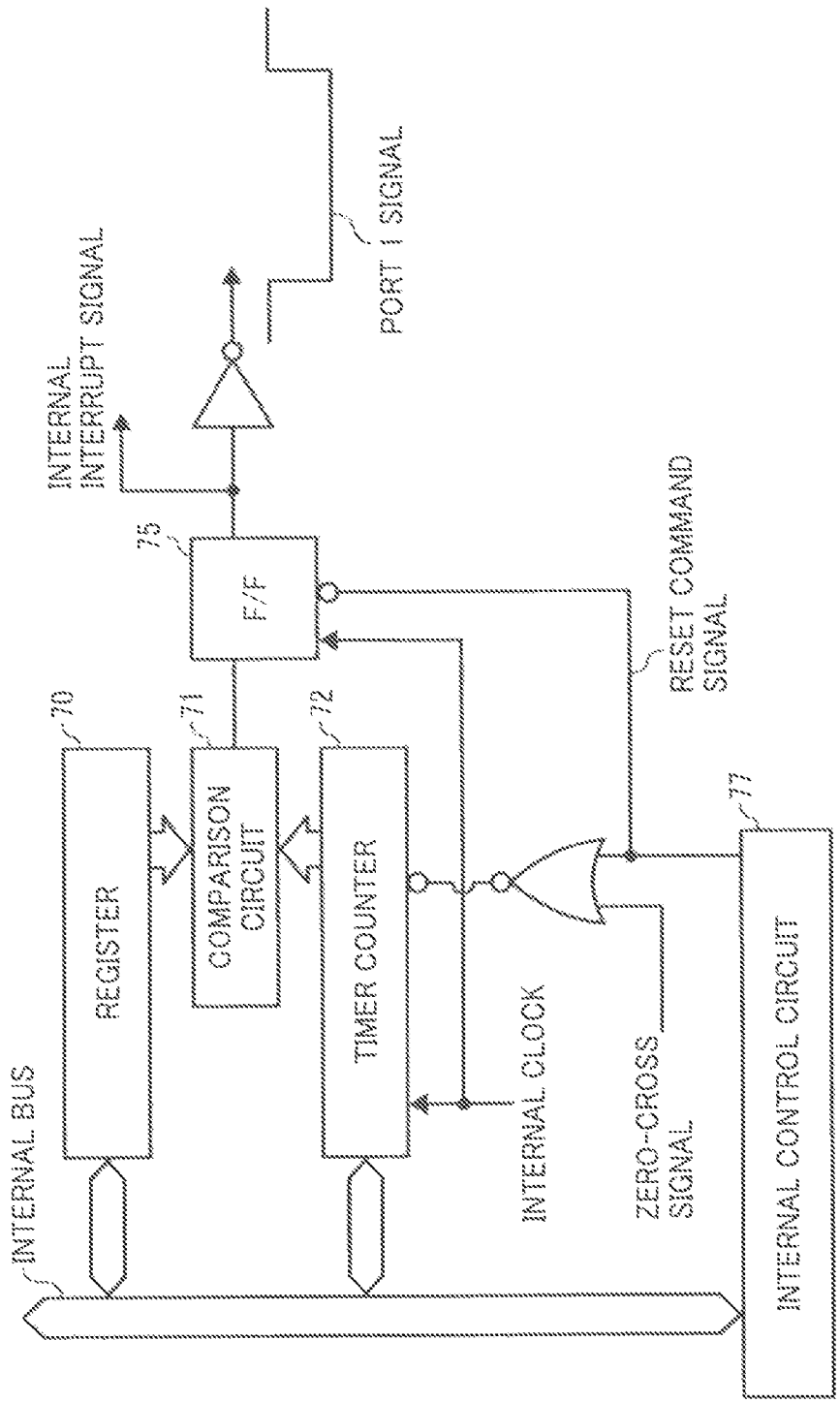
FIG. 3 is an example of circuitry to detect a power cut.

The power-cut detecting circuit 8 detects loss of a zero-cross signal, thereby detecting a power cut. FIG. 3 is an example functional circuitry of an internal timer of the CPU 26 to detect a power cut by detecting loss of a zero-cross signal.

A timer counter 72 counts internal clocks. The timer counter 72 is reset by a zero-cross signal or a reset command signal output via software to an internal control circuit 77. That is, the timer counter 72 continues counting until issuance of a zero-cross signal or a reset command signal.

A resistor 70 is written through software, in which is preset a value to be counted that is larger than an interval between zero-cross signals. In the first embodiment, a zero-cross signal is generated twice or more during a period of 20 milliseconds when, for example, the commercial power supply 46 supplies power at a frequency of 50 hertz. Thus, a value equal to or more than 25 milliseconds is set in the resistor 70 to allow a margin.

When the count of the timer counter 72 reaches the value set in the resistor 70 after loss of a zero-cross signal, a comparison circuit 71 outputs a match signal. An internal latch, i.e., flip-flop (F/F), circuit 75 latches the match signal, and outputs it to the first port. In response to the match signal, the CPU 26 performs interrupt processing (described in detail later). Depending on the operating state of the image forming apparatus, the CPU 26 performs a predetermined process, and after that, instructs via software the internal control circuit 77 to issue a reset command signal. The reset command signal resets the latch circuit 75 and the timer counter 72.

Figure 4:
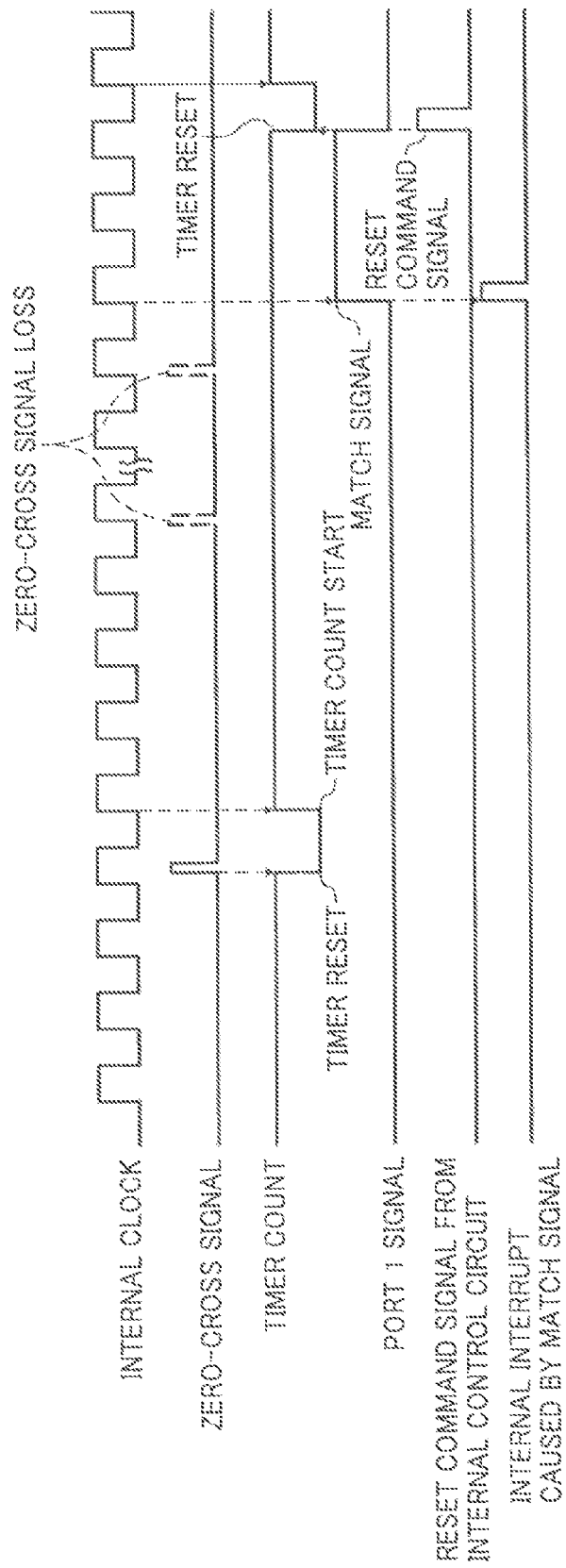
FIG. 4 is a timing chart for explaining timing to supply capacitor power according to zero-cross signal loss.

FIG. 4 is a timing chart for explaining timing to supply power from the capacitor 100 according to zero-cross signal loss. An uppermost line in FIG. 4 indicates a reference internal clock, by which the timer counter 72 is incremented (the timer counter 72 counts the time). At a time point when a zero-cross signal is generated, the timer counter 72 is reset, and restarts counting from the pulse of the next internal clock.

For example, when zero-cross signal loss is detected twice while the timer counter 72 counts 20 milliseconds based on internal clocks, the comparison circuit 71 outputs a match signal to the first port. The match signal causes an internal interrupt. After the image forming apparatus performs a predetermined process, the internal control circuit 77 issues a reset command signal. With this, the latch circuit 75 is initialized so that a match signal is not to be generated, and the timer counter 72 is reset.

Figure 5:
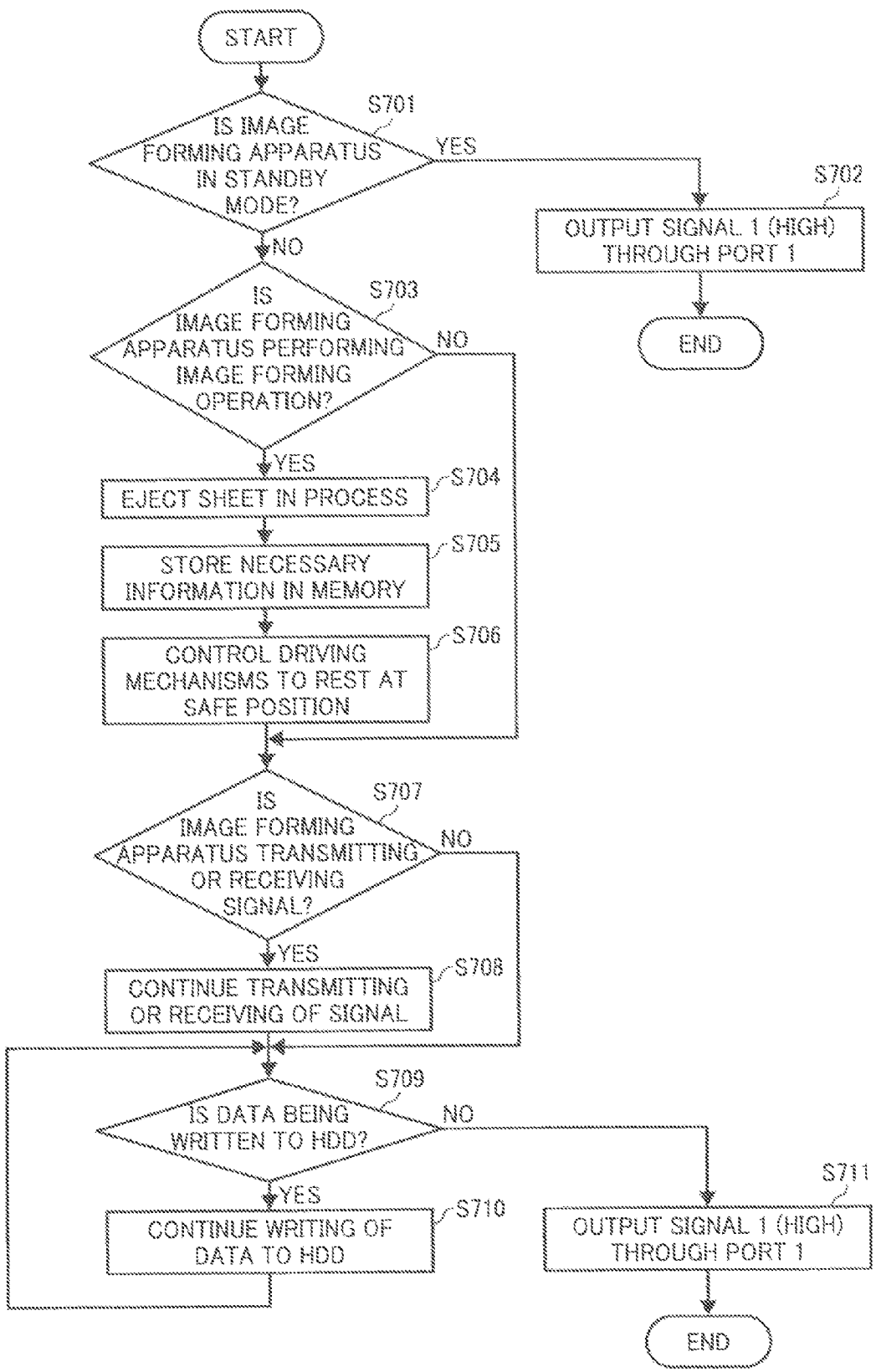
FIG. 5 is a flowchart of internal-interrupt processing performed by a control unit shown in FIG. 1.

FIG. 5 is a flowchart of internal-interrupt processing performed by the control unit 10. First, the CPU 26 determines whether the image forming apparatus is in standby mode (step S701). When the image forming apparatus is in standby mode (Yes at step S701), the CPU 26 outputs a signal 1 (high) through the first port (step S702), and the internal-interrupt processing ends. When the image forming apparatus is not in standby mode (No at step S701), the CPU 26 determines whether the image forming apparatus is performing an image forming operation (step S703).

When the image forming apparatus is performing an image forming operation (Yes at step S703), the CPU 26 ejects a sheet in the process of the image forming operation (step S704). The CPU 26 stores information necessary for the image forming operation in the memory 13 (step S705). The CPU 26 controls driving mechanisms to rest at a safe position (step S706). When the image forming apparatus is not performing an image forming operation (No at step S703), the process control moves to step S707.

The CPU 26 determines whether the image forming apparatus is transmitting or receiving a signal (step S707). Examples of the signal include a signal of image data received via a network. When the image forming apparatus is transmitting or receiving a signal (Yes at step S707), the CPU 26 allows the image forming apparatus to continue transmitting or receiving the signal (step S708). When the image forming apparatus is not transmitting or receiving a signal (No at step S707), the process control moves to step S709.

The CPU 26 determines whether data is being written to the HDD (step S709). When data is being written to the HDD (Yes at step S709), the CPU 26 allows to continue the writing of the data to the HDD (step S710). When data is not being written to the HDD (No at step S709), the CPU 26 outputs a signal 1 (high) through the first port (step S711), and the internal-interrupt processing ends.

The control unit 10 can perform the internal-interrupt processing as shown in FIG. 5 either when detecting a power cut after detecting a voltage drop, or at the point of detecting a voltage drop.

The voltage-drop detecting circuit 37 detects a drop of a full-wave rectified DC voltage converted from the voltage of the commercial power supply 46. Generally, image forming apparatuses are designed so as to operate without problem even if there is a variation of about ±10% in the commercial power supply. Therefore, the voltage-drop detecting circuit 37 outputs a voltage-drop signal upon detecting a voltage drop to less than that of −10% of the commercial power supply 46.

Figure 6:
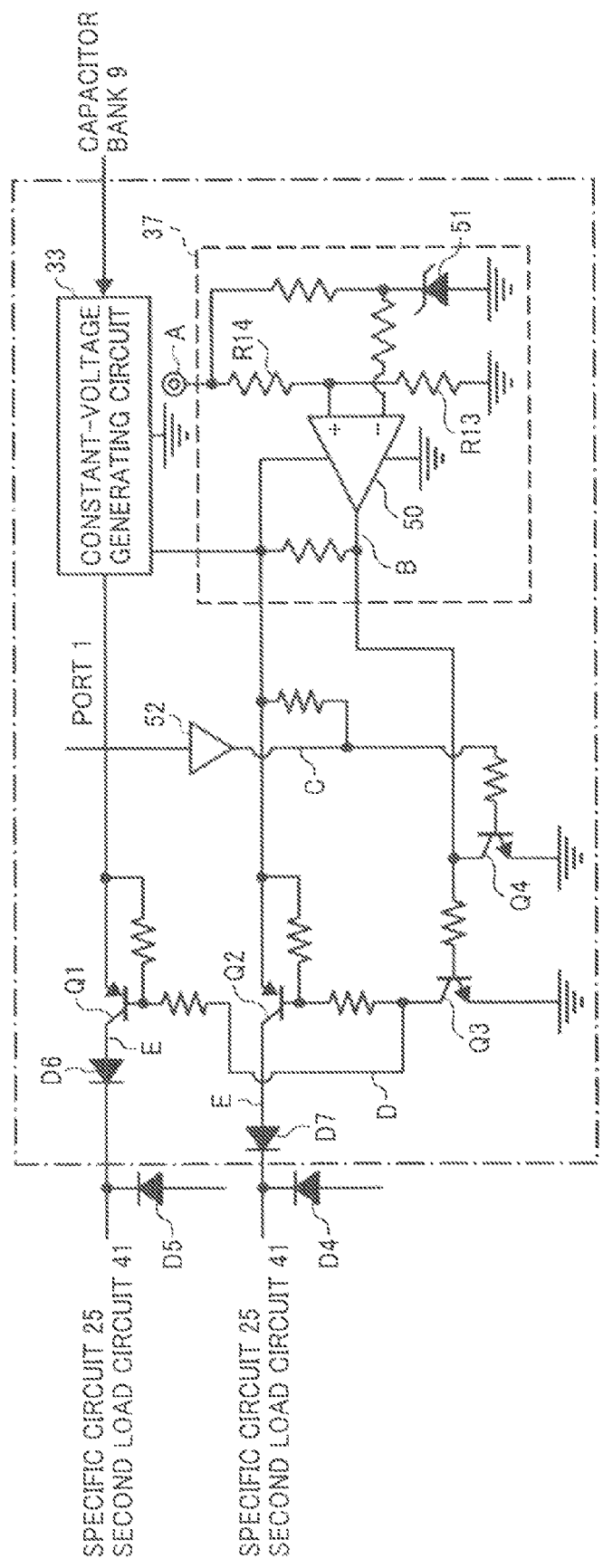
FIG. 6 is an example of circuitry of a voltage-drop detecting circuit and a power supply circuit shown in FIG. 1.

FIG. 6 is an example of circuitry of the voltage-drop detecting circuit 37 and a power supply circuit for supplying power at the time of a power cut based on the output of the voltage-drop detecting circuit 37. The voltage-drop detecting circuit 37 includes a comparator 50 of the open-collector type, and with this, detects a voltage drop to the lowest limit of the range that does not cause malfunction of the image forming apparatus. That is, the voltage-drop detecting circuit 37 detects the lowest voltage at which the image forming apparatus can operate normally. Thus, the capacitor 100 can supply power before the image forming apparatus suffers from malfunction. A rectified voltage output from the full-wave rectifying circuit 2 is smoothed by the capacitor C1, and is used to detect a voltage drop. This smoothed voltage is divided by resistors R14 and R13. The comparator 50 receives the smoothed voltage via its inverting input terminal, and receives the voltage of a Zener diode via its non-inverting input terminal.

Resistance values of the respective resistors R14 and R13 are determined such that the voltage of the inverting input terminal is higher than that of the non-inverting input terminal in normal operation, while the voltage of the inverting input terminal is lower than that of the non-inverting input terminal when a power cut occurs, i.e., the voltage of the commercial power supply 46 drops to 90 volts or less. With this, the output voltage of the comparator 50 has a waveform as indicated by "voltage waveform B" in FIG. 7 (described later).

The output of the control unit 10 is input via the first port to a buffer 52 of the open-collector type. Through the first port, the CPU 26 outputs a signal 0 (low) in advance when the main power switch 11 is turned on so that a transistor Q4 is OFF. The comparator 50 outputs a signal 0 (low) while power is supplied from the commercial power supply 46 normally so that a transistor Q3 is OFF. Accordingly, transistors Q1 and Q2 are OFF, and therefore, the output of the constant-voltage generating circuit 33 is not fed to the specific circuit 25 and the second load circuit 41.

On the other hand, when the voltage of the commercial power supply 46 drops to 90 volts or less, the voltage of the inverting input terminal is lower than that of the non-inverting input terminal as described above. In such a case, the comparator 50 outputs a signal 1 (high) so that the transistor Q3 is ON. When the transistor Q3 is turned on, the transistors Q1 and Q2 are also turned on, and the output of the constant-voltage generating circuit 33 is fed to the specific circuit 25 and the second load circuit 41. In other words, power is supplied from the capacitor 100 (the capacitor bank 9) to the specific circuit 25 and the second load circuit 41.

Depending on the operating state of the image forming apparatus, the CPU 26 performs a predetermined process, and after that, outputs via the first port a signal 1 (high) so that the transistor Q4 is turned on. Accordingly, the transistor Q3 is turned off, and also the transistors Q1 and Q2 are turned off, which stops power supply from the constant-voltage generating circuit 33 to the specific circuit 25 and the second load circuit 41.

When the main power switch 11 is OFF, the buffer 52 is OFF. This means that the transistor Q4 is ON, the transistor Q3 is OFF, and the transistors Q1 and Q2 are also OFF. Accordingly, the constant-voltage generating circuit 33 is not supplying power to the specific circuit 25 and the second load circuit 41. As a result, power is not supplied from the capacitor 100 (the capacitor bank 9) when the main power switch 11 is OFF, which prevents waste power consumption.

Figure 7:
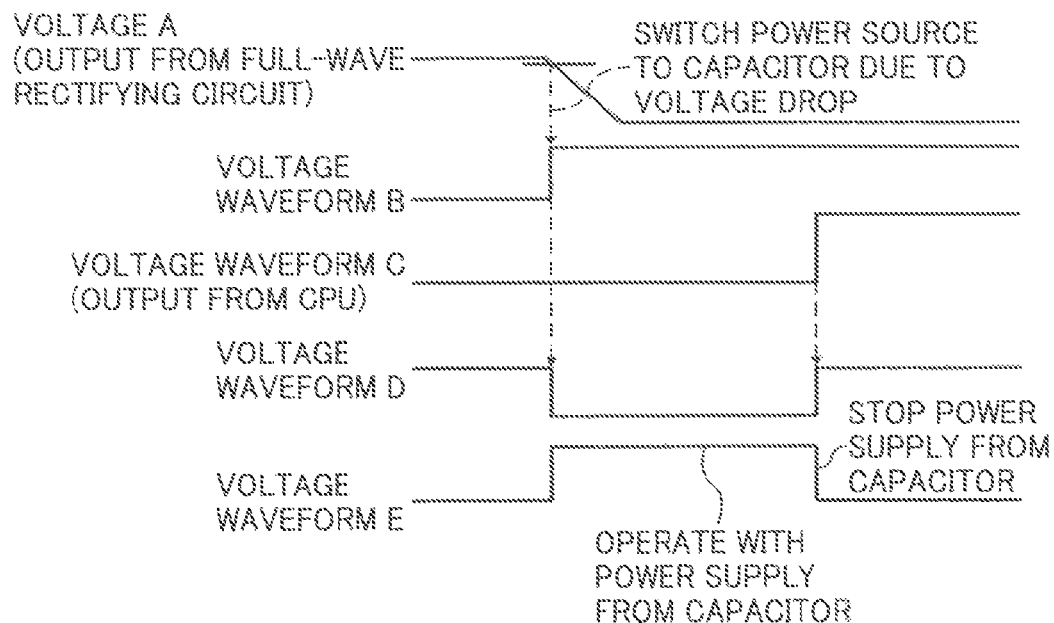
FIG. 7 is a timing chart for explaining timing to switch power sources from commercial power supply to a capacitor shown in FIG. 1.

FIG. 7 is a timing chart for explaining timing to switch power sources from the commercial power supply 46 to the capacitor 100. In FIG. 7 voltage waveforms at points A, B, C, D, and E indicated in FIG. 6 are depicted in time series.

Voltage at point A (voltage A) indicates a voltage output from the full-wave rectifying circuit 2, i.e., the voltage of the commercial power supply 46. When the voltage A drops from a normal value to a predetermined value or less (e.g., 90 volts or less), the output of the comparator 50 with a voltage waveform at point B (voltage waveform B) changes from "0" (low) to "1" (high).

Waveform at point C (voltage waveform C) indicates that of a signal output from the CPU 26 through the first port. The CPU 26 outputs a signal 0 (low) when the main power switch 11 is ON, while it outputs a signal 1 (high) when the main power switch 11 is OFF. Waveform at point D (voltage waveform D) indicates a waveform of voltage supplied from the commercial power supply 46 to the specific circuit 25 and the second load circuit 41. Waveform at point E (voltage waveform E) indicates a waveform of voltage supplied from the capacitor 100 to the specific circuit 25 and the second load circuit 41. As indicated by voltage waveform E in FIG. 7, the capacitor 100 stops power supply after the image forming apparatus completes a predetermined process not to cause operational failure or malfunction in the image forming apparatus.

Figure 8:
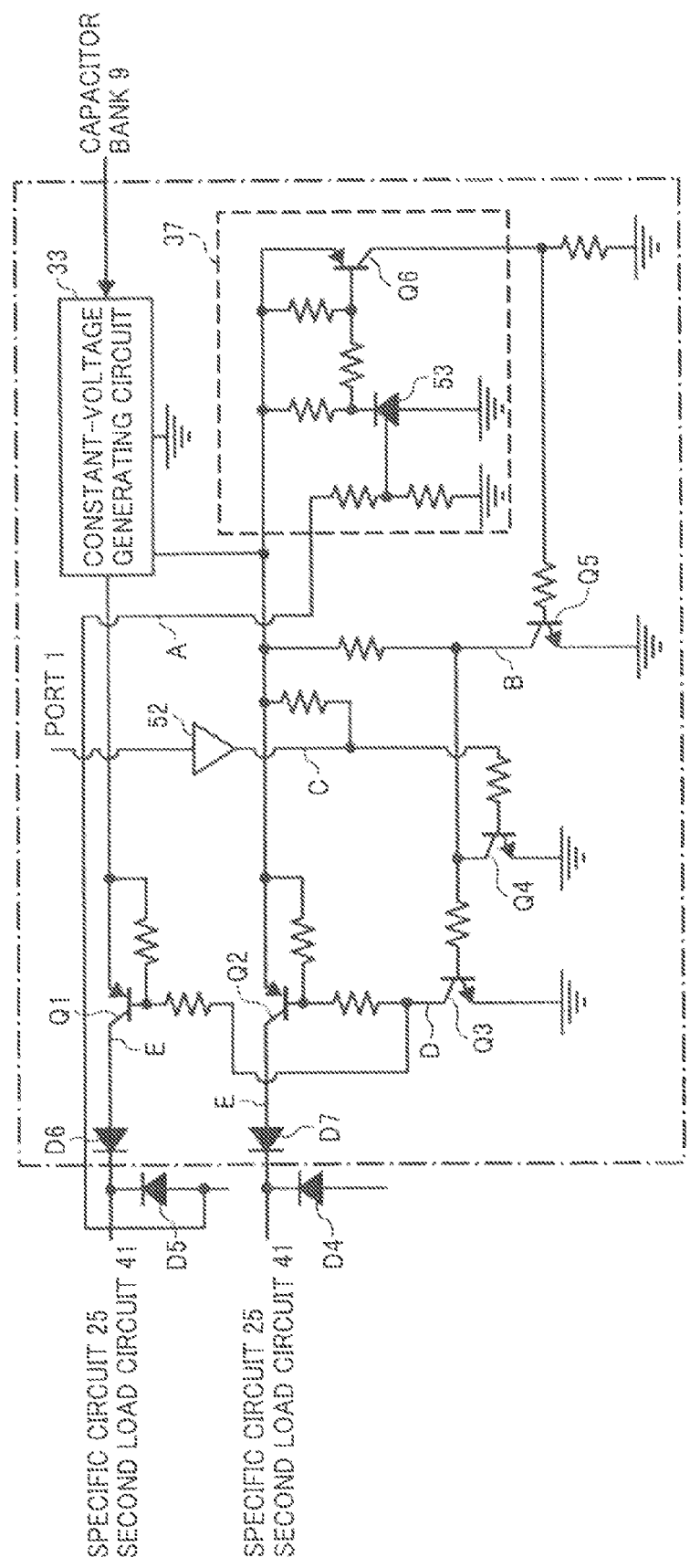
FIG. 8 is another example of circuitry of a voltage-drop detecting circuit and a power supply circuit shown in FIG. 1.

FIG. 8 is another example of circuitry of the voltage-drop detecting circuit 37 and the power supply circuit. In the example of FIG. 8, the voltage-drop detecting circuit 37 includes a shunt regulator 53, and detects a voltage drop by using, as a reference voltage, a high voltage supplied to driving loads. The image forming apparatus has a tolerance to about ±10% of variation in the reference voltage, and therefore, the voltage-drop detecting circuit 37 operates when voltage drops to less than that of −10% of the reference voltage.

While the reference voltage is normal, the shunt regulator 53 is ON, and accordingly, a transistor Q6 is ON. When the transistor Q6 is turned on, the transistor Q5 is also turned on, and the transistor Q3 is turned off. When the transistor Q3 is turned off, the transistors Q1 and Q2 are also turned off, which stops power supply from the constant-voltage generating circuit 33 to the specific circuit 25 and the second load circuit 41.

Upon detection of a drop in the reference voltage, the shunt regulator 53 is turned off, and the transistor Q6 is turned off. When the transistor Q6 is turned off, the transistor Q5 is also turned off, and the transistor Q3 is turned on. When the transistor Q3 is turned on, the transistors Q1 and Q2 are also turned on. Thus, power is supplied from the constant-voltage generating circuit 33 to the specific circuit 25 and the second load circuit 41.

Depending on the operating state of the image forming apparatus, the CPU 26 performs a predetermined process, and after that, outputs via the first port a signal 1 (high) so that the transistor Q4 is turned on. Accordingly, the transistor Q3 is turned off, and also the transistors Q1 and Q2 are turned off, which stops power supply from the constant-voltage generating circuit 33 to the specific circuit 25 and the second load circuit 41. Timing of a sequence of these operations is basically the same as previously described in connection with FIG. 7, and the same description is not repeated here.

The voltage of the capacitor bank 9 is input to the constant-voltage generating circuit 33, and the constant-voltage generating circuit 33 generates a voltage for control circuits as well as a voltage for driving circuits and driving-power supply. The voltage for the control circuits is supplied from the constant-voltage generating circuit 33 to the specific circuit 25 and the second load circuit 41 through the transistors Q1 and a diode D6.

Upon detecting a voltage drop, the voltage-drop detecting circuit 37 outputs a signal 0 (low) to the negative logic AND circuit (positive logic OR circuit) 24. Because the CPU 26 outputs a signal 0 (low) in advance to the AND circuit 24 through the first port, the AND circuit 24 outputs the signal 0 (low) to individual bases of the transistors Q1 and Q2 to turn on the transistors Q1 and Q2. As a result, the voltage for the control circuits is supplied from the constant-voltage generating circuit 33 to the specific circuit 25 and the second load circuit 41 through the transistors Q1 and a diode D6. On the other hand, the voltage for the driving circuit and the driving-power supply is supplied from the constant-voltage generating circuit 33 to the specific circuit 25 and the second load circuit 41 through the transistors Q2 and a diode D7.

Upon detection of loss of a zero-cross signal, the CPU 26 determines that a power cut is detected, and performs the interrupt processing. If the image forming apparatus is in standby mode without performing any of image forming operation, data transmission or reception, and writing of data to the HDD, the CPU 26 outputs a signal 1 (high) to the AND circuit 24 through the first port. Thus, the AND circuit 24 outputs the signal 1 (high) to turn off the transistors Q1 and Q2, which stops supply of the voltage for the control circuits, the driving circuit, and the driving-power supply.

When the image forming apparatus is performing an image forming operation, the CPU 26 ejects, to a first eject tray, a sheet that carries an image formed thereon and has passed through the fixing device 111. The CPU 26 also ejects a sheet on which an image is yet to be formed to a second eject tray. The CPU 26 then stores necessary information in the memory 13, and controls the driving mechanisms to rest at a safe position. This is because if power supply is interrupted while a driving mechanism, e.g., an optical scanner, is returning to its home position after scanning an image, the optical scanner, which has become out of control, bumps into a guide member and may be broken. Such an event can be prevented by stopping power supply from the capacitor 100 after the optical scanner arrives at its home position.

The CPU 26 checks whether the image forming apparatus is transmitting or receiving data via a network. When the image forming apparatus is transmitting or receiving data, the CPU 26 allows to complete the data transmission or reception. The CPU 26 then checks whether data is being written to the HDD. When data is being written to the HDD, the CPU 26 allows to complete the writing of the data. After performing the series of the operations, the CPU 26 outputs a signal 1 (high) to the AND circuit 24 through the first port. This prevents data loss, damage of equipment, and the like. Incidentally, if the capacitor 100 has a large capacity and stores therein a large amount of charge, power supply from the capacitor 100 can be stopped after completion of an image forming operation in process.

The DC/DC converter 14 normally generates power for the control circuits, the driving circuits, and the driving-power supply unless a power cut occurs. The voltage for the control circuits is supplied from the DC/DC converter 14 to the specific circuit 25 and the second load circuit 41 through the control unit 10 and the diode D5. On the other hand, the voltage for the driving circuits and the driving-power supply is supplied from the DC/DC converter 14 to the specific circuit 25 and the second load circuit 41 through the control unit 10, the first load circuit 21, and the diode D4.

Figure 9:
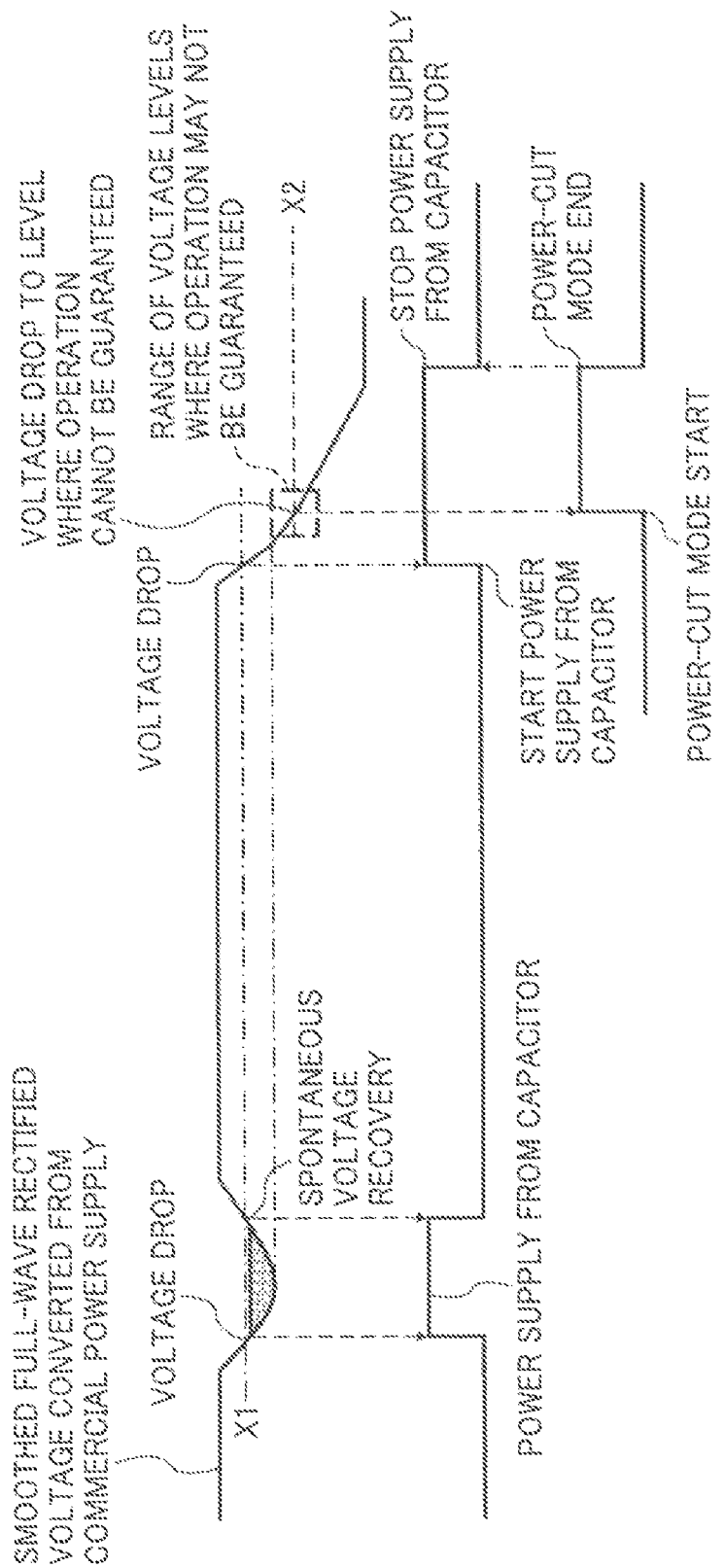
FIG. 9 is a timing chart for explaining timing to use capacitor power when the voltage of commercial power supply drops or commercial power supply is interrupted.

FIG. 9 is a timing chart for explaining timing to use power stored in the capacitor 100 when the voltage of the commercial power supply 46 drops or a power cut occurs. The components of the image forming apparatus are designed so as to operate without problem at different levels of variation in commercial power supply taking margin into account. That is, generally, image forming apparatuses as a whole are designed so as to operate without problem even if there is a variation of about ±10% in the commercial power supply. However, some components of image forming apparatuses can operate without problem even if there is a variation of about ±15% in the commercial power supply, and some cannot. Therefore, to ensure the operation of the image forming apparatus at the time of a power cut, data backup and the like is required at the point the voltage of commercial power supply drops to less than −10% thereof. Thus, when the voltage of the commercial power supply 46 drops to less than −10% thereof, the CPU 26 determines that a power cut occurs, and the image forming apparatus enters power-cut mode. In this power-cut mode, the CPU 26 and its peripheral circuits including the specific circuit 25 need power supply from the capacitor 100 to operate normally.

As shown in FIG. 9, a smoothed full-wave rectified voltage, i.e., a full-wave rectified voltage that has been converted from the voltage of the commercial power supply 46 and smoothed, is generally constant. When the smoothed full-wave rectified voltage drops for some reason to voltage X1 (a voltage higher than a voltage that may cause malfunction of the image forming apparatus), the capacitor 100 supplies power to the specific circuit 25 even if the CPU 26 has not determined that a power cut occurs. After that, when the voltage recovers spontaneously (when the commercial power supply 46 becomes capable of supplying voltage equal to or higher than voltage X1), the control unit 10 stops power supply from the capacitor 100 without entering power-cut mode. With this, power can be supplied from the capacitor 100 before the voltage drops to a level where the image forming apparatus may suffer from malfunction. Thus, detection of a power cut and operation in power-cut mode are not interfered.

If the voltage drops again for some reason to voltage X1 after the recovery, the capacitor 100 supplies power stored therein. With this, power can be supplied from the capacitor 100 before a power cut occurs, which guarantees the operation of the image forming apparatus. When the voltage further drops to voltage X2 and a power cut is detected, the specific circuit 25 enters power-cut mode, and performs a predetermined operation. On completion of the operation, the specific circuit 25 resumes from power-cut mode, and is not supplied with power from the capacitor 100.

Incidentally, as well as supplying power until a voltage is detected that is equal to or higher than voltage X1 as described above, the capacitor 100 can supply power for a predetermined period of time when the voltage further drops from voltage X2.

As described above, when a power cut occurs, power is supplied from the capacitor 100 before the voltage drops to a level at which there is no guarantee that the image forming apparatus will operate properly. This prevents unstable power supply, and in turn prevents shortage of power supply to the specific circuit 25. Thus, it is possible to prevent errors in detecting a power cut and malfunction of driving mechanisms caused by shortage of power supply. Thus, data, such as image data used for an image forming operation in process and data being transmitted or received via a network, can be saved.

Meanwhile, conventional image forming apparatuses has complex circuitry that generates a constant voltage to supply a predetermined voltage to a specific circuit and a specific load, thereby guaranteeing its operation even when commercial power supply is interrupted. However, according to the first embodiment, upon detection of a predetermined voltage drop, power is supplied from the capacitor 100 to the specific circuit 25 and the second load circuit 41. Therefore, the constant-voltage generating circuit 33 can be simplified.

Moreover, when commercial power supply is interrupted, a voltage drop is detected before a power cut, which prevents even a short period of interruption in power supply to the specific circuit 25 and the second load circuit 41. Thus, the image forming apparatus can operate without malfunction.

Incidentally, when a voltage drop is detected, power can be supplied from the capacitor 100 to, in addition to the specific circuit 25 and the second load circuit 41, all circuits and all loads that need power supply. The image forming apparatus can include circuits and loads that operate only during a low-voltage period, and power can be supplied from the capacitor 100 to such circuits and loads other than those supplied with power in normal operation to perform specific operations during a low-voltage period. The image forming apparatus can also include a memory dedicated for saving data when a voltage drop occurs.

Figure 10:
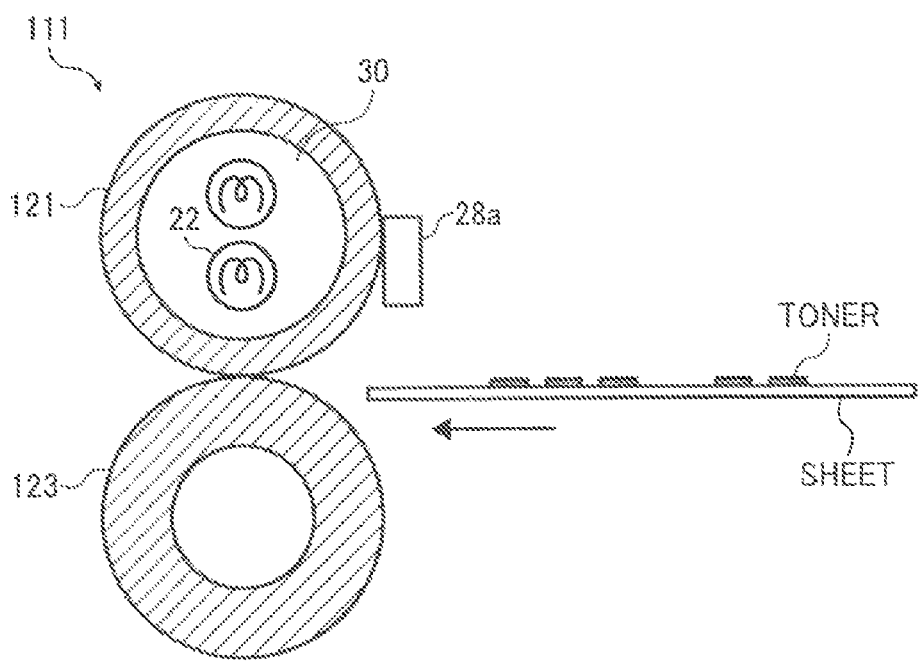
FIG. 10 is a vertical cross section of a fixing device of an image forming apparatus.

FIG. 10 is a vertical cross section of the fixing device 111 of the image forming apparatus. The fixing device 111 includes the fixing roller 121, a pressing roller 123, and a pressing member (not shown) that presses the pressing roller 123 against the fixing roller 121 with a predetermined force. The fixing roller 121 and the pressing roller 123 are driven by a driving mechanism (not shown) to rotate.

The fixing device 111 further includes two heaters, i.e., the AC fixing heater 30 and the DC fixing heater 22, and the thermistor 28a. The AC fixing heater 30 and the DC fixing heater 22 are arranged inside the fixing roller 121, and heat the fixing roller 121 from the inside thereof. The thermistor 28a is arranged to abut the surface of the fixing roller 121 to detect a surface temperature (fixing temperature) of the fixing roller 121.

The AC fixing heater 30 and the DC fixing heater 22 are ON to heat the fixing roller 121 while the temperature of the fixing roller 121 is lower than a target value. The DC fixing heater 22 is an auxiliary heater used when, for example, the image forming apparatus is turned on or resumes from standby mode (power-save mode) to normal operation. That is, while the fixing device 111 is warming up, the DC fixing heater 22 heats the fixing device 111 by using power from the capacitor 100 to warm up the fixing device 111 to its operation temperature.

With the fixing device 111, a toner image is fixed to a sheet by heat and pressure while the sheet that carries the toner image is passing through a nip between the fixing roller 121 and the pressing roller 123.

While, in the first embodiment, commercial power supply is cited as external power supply by way of example and without limitation, the image forming apparatus cab be supplied with power from private power supply and the like.

Figure 11:
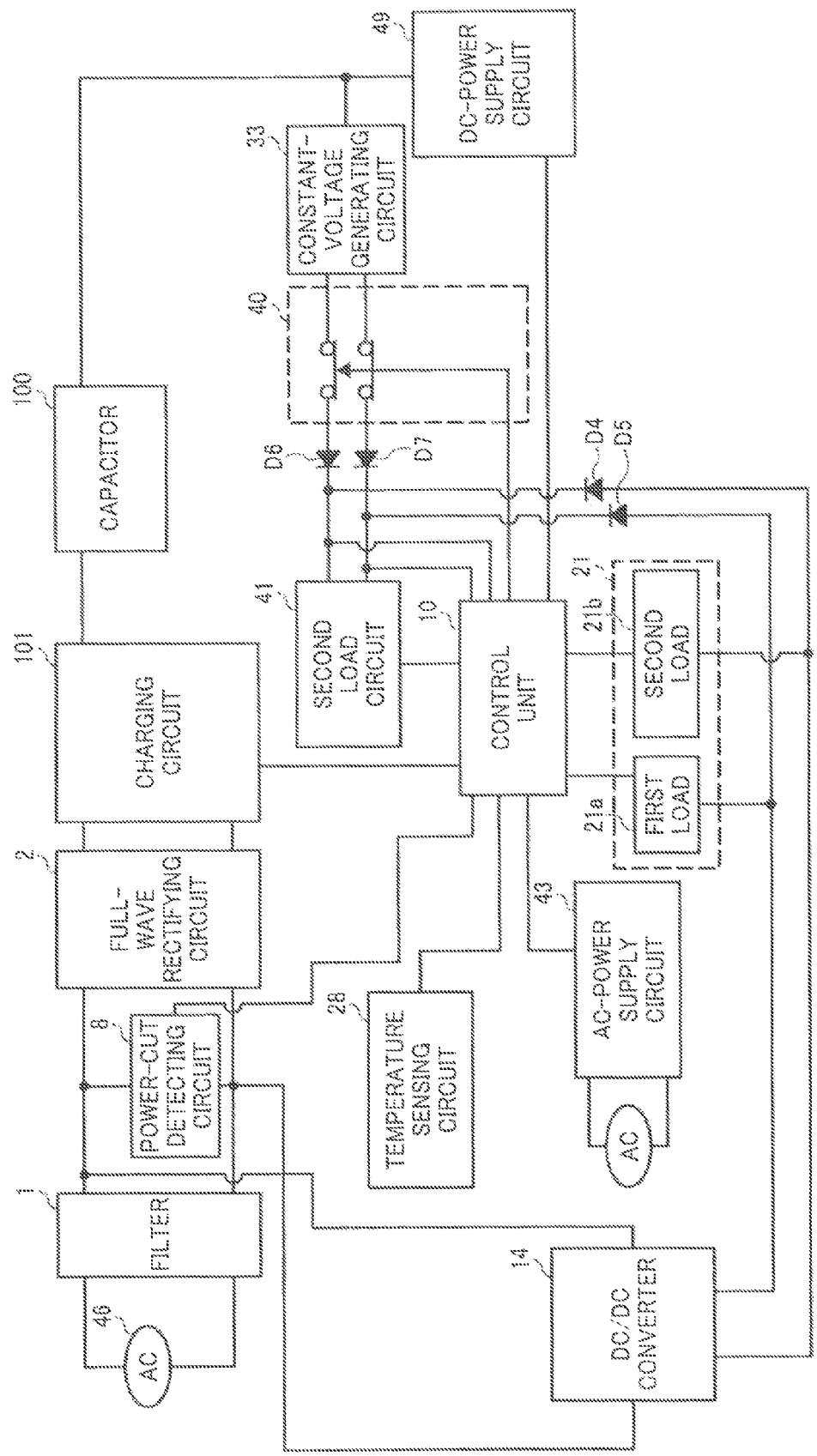
FIG. 11 is a schematic diagram of a power-supply unit according to a second embodiment of the present invention.

FIG. 11 is a schematic diagram of a power-supply unit according to a second embodiment of the present invention. A case where the power-supply unit shown in FIG. 11 is used in an image forming apparatus is explained below; however, the power-supply unit can be used in devices other than image forming apparatuses with some or no modification. The power-supply unit shown in FIG. 11 is basically similar to that of FIG. 1 except for the absence of the voltage-drop detecting circuit 37, and the same description is not repeated.

The power-supply unit detects a voltage drop and an interruption, both temporary and sustained, in commercial power supply. Upon detection of such an event, the power-supply unit of the second embodiment couples a power line through which power is supplied from commercial power supply to a power line through which power is supplied from a capacitor, so that power is automatically supplied from the capacitor to the specific load when the voltage of the commercial power supply drops to less than that of the capacitor.

Figure 12:
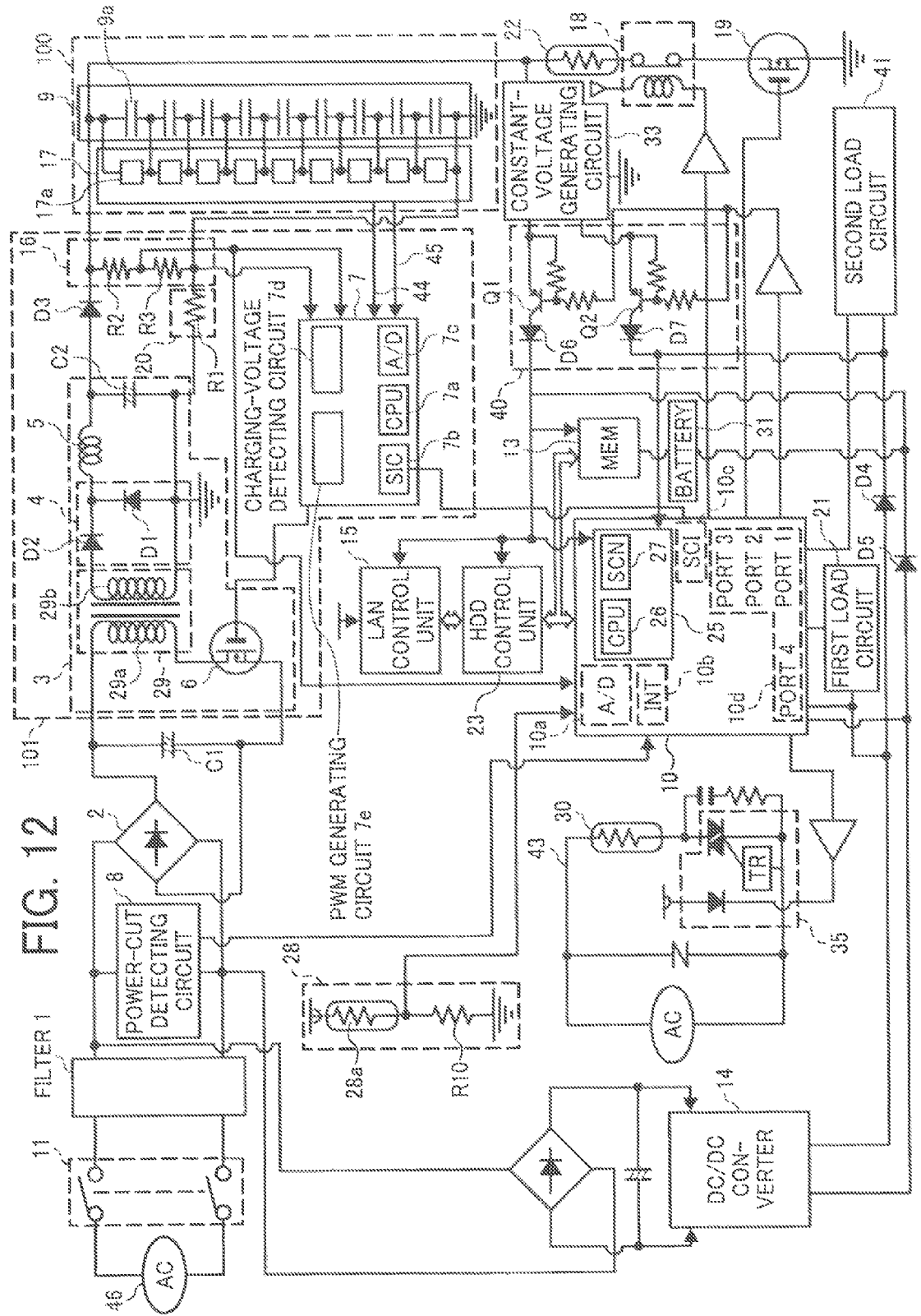
FIG. 12 is a detailed circuitry of the power-supply unit shown in FIG. 11.

FIG. 12 is a detailed circuitry of the power-supply unit. The output voltage of the DC/DC converter 14 is preset higher than that of the constant-voltage generating circuit 33. Accordingly, power is supplied from the commercial power supply 46 during normal operation, and output of the constant-voltage generating circuit 33, i.e., power stored in the capacitor 100, is not supplied to the specific circuit 25 and the second load circuit 41. On the other hand, when the voltage of the commercial power supply 46 drops, or the commercial power supply 46 is interrupted, it is checked that the output voltage of the DC/DC converter 14 has dropped to less than that of the constant-voltage generating circuit 33 generated based on the output of the capacitor 100. If the output voltage of the DC/DC converter 14 has dropped to such a level, power is automatically supplied from the capacitor 100 to the specific circuit 25 and the second load circuit 41.

When the power-cut detecting circuit 8 detects loss of a zero-cross signal and thereby detects a power cut, after the predetermined process described previously in the first embodiment, the CPU 26 outputs through the first port a signal to stop power supply from the constant-voltage generating circuit 33 to the second load circuit 41.

As described above, in the second embodiment, upon detection of a voltage drop and an interruption, both temporary and sustained, in commercial power supply, power is automatically supplied from an auxiliary power supply without switching control of power sources. Thereafter, when a power cut is detected, the image forming apparatus enters power-cut mode. With this, power can be supplied to the specific circuit 25 and the second load circuit 41 without interruption. Thus, the image forming apparatus can operate without problem even during a temporary interruption or voltage drop of commercial power supply as well as a power cut, which improves the reliability of the image forming apparatus.

Figure 13:
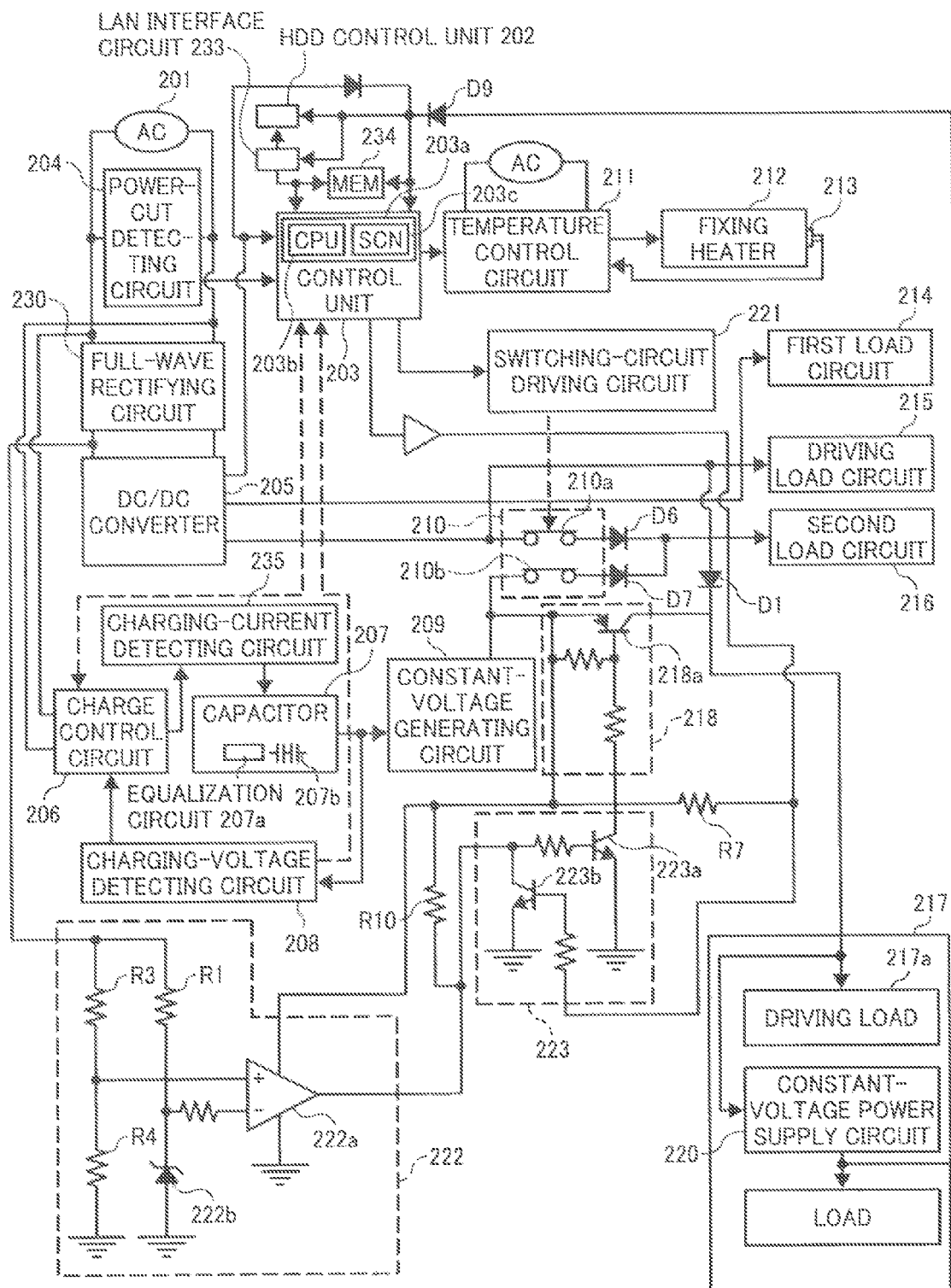
FIG. 13 is a schematic diagram of a power-supply unit according to a third embodiment of the present invention.

FIG. 13 is a schematic diagram of a power-supply unit according to a third embodiment of the present invention. A case where the power-supply unit shown in FIG. 13 is used in an image forming apparatus is explained below; however, the power-supply unit can be used in devices other than image forming apparatuses with some or no modification. The power-supply unit of the third embodiment supplies power, when commercial power supply is insufficient for a specific operation, from a capacitor to a load that needs high power (e.g., driving load). Meanwhile, the power-supply unit supplies AC power from commercial power supply to heating units of a fixing device. In addition, upon detection of a voltage drop and an interruption, power is supplied from the capacitor to a specific circuit and a specific load. Thus, it is possible to prevent temperature drop during serial copying by the image forming apparatus as well as to reduce the warm-up period of the fixing device.

As shown in FIG. 13, the power-supply unit includes a control unit 203, a power-cut detecting circuit 204, a DC/DC converter 205, a capacitor 207, a constant-voltage generating circuit 209, a temperature sensing element 213, a first load circuit 214, a driving load circuit 215, a second load circuit 216, a third load circuit 217, an open-close circuit 218, a voltage-drop detecting circuit 222, a power switching circuit 223, and a full-wave rectifying circuit 230. The capacitor 207 includes an equalization circuit 207*a* and a capacitor bank 207*b*. The capacitor bank 207*b* is formed of a plurality of double-layer capacitors that are connected in series.

The capacitor 207 further includes a bypass circuit (not shown) that, when one of the cells of a double-layer capacitor is charged to its full capacity, bypasses the cell, i.e., charges the next one of the cells without charging the cell. The equalization circuit 207*a* includes a circuit that outputs a single-cell full-load signal when any one of cells of a double-layer capacitor is fully charged, and a circuit that outputs an all-cell full-load signal when all the double-layer capacitors are fully charged. The cell structure is such that the capacity of the capacitor bank 207*b* (the capacitor 207) is sufficient to supplement AC power that prevents temperature drop during serial copying by the image forming apparatus as well as to achieve the warm-up period of the fixing device.

The capacitor 207 is connected to a charging-voltage detecting circuit 208. The charging-voltage detecting circuit 208 includes resistors that constitute a voltage-divider circuit, and detects the voltage across the capacitor bank 207*b*. The output of the charging-voltage detecting circuit 208 is input to a charge control circuit 206.

The capacitor 207 is also connected to a charging-current detecting circuit 235. The charging-current detecting circuit 235 detects the current across the capacitor bank 207*b* by monitoring the current flowing in a resistor that is connected in series to the capacitor bank 207*b*. The output of the charging-current detecting circuit 235 is input to the charge control circuit 206.

The charge control circuit 206 is fed with a smoothed full-wave rectified voltage, i.e., a full-wave rectified voltage that has been converted from the voltage of a commercial power supply 201 and smoothed by a smooth circuit (not shown). The charge control circuit 206 includes a voltage-generating circuit (not shown) that generates a voltage to charge the capacitor bank 207*b*, and an output-voltage control circuit (not shown) that controls the voltage output from the voltage-generating circuit. The charge control circuit 206 charges the capacitor bank 207*b* with constant current, constant power, and constant voltage based on the output of the charging-voltage detecting circuit 208 and that of the charging-current detecting circuit 235.

The charge control circuit 206 detects the voltage across the capacitor bank 207*b* from the output of the charging-voltage detecting circuit 208. When the voltage across the capacitor bank 207*b* is lower than a preset value, the charge control circuit 206 successively detects the voltage output from the charging-voltage detecting circuit 208. The charge control circuit 206 then charges the capacitor bank 207*b* with preset constant current corresponding to the detected voltage.

When the voltage across the capacitor bank 207*b* rises to a value equal to or higher than the preset value, the charge control circuit 206 successively detects the charging current of the capacitor bank 207*b* and the voltage across the capacitor bank 207*b*. Based on the detected charging current and voltage, the charge control circuit 206 charges the capacitor bank 207*b* with preset constant power.

Upon detecting a single-cell full-load signal output from the equalization circuit 207*a*, the charge control circuit 206 charges again the capacitor bank 207*b* with the preset constant current. On the other hand, upon detecting an all-cell full-load signal, the charge control circuit 206 charges the capacitor bank 207*b* to a constant voltage during a predetermined period, and then stops the charging operation.

The control unit 10 is constituted of a main control unit, an engine control unit, an operation control unit, a read-control unit, and a write-control unit. The main control unit controls the image forming apparatus. The engine control unit controls the operation to form an image. The operation control unit controls the receipt of input such as settings or parameters specified by a user though a touch panel, etc., and display of such information. The read-control unit controls optical reading of image data. The write-control unit controls writing of the image data to a photosensitive drum.

The control unit 203 includes a specific circuit 203*a* that is supplied with power at the time of interruption of power from the commercial power supply 201. The specific circuit 203*a* includes a CPU 203*b*, a scanner control circuit (SCN) 203*c*, and peripheral circuits such as I/O ports. The CPU 203*b* is connected via an internal bus to a serial controller, the I/O ports, an A/D converter, an interrupt control circuit, NVRAM, a ROM, a RAM, a timer, and the like, which are not shown in the drawings.

The power-supply unit further includes an HDD control unit 202 and a LAN interface circuit 233 that are also supplied with power at the time of interruption of power from the commercial power supply 201. The LAN interface circuit 233 is a communication interface board for an in-house LAN and controllers, and the image forming apparatus communicates with an external device through the LAN interface circuit 233. If a power cut occurs during communication via the LAN interface circuit 233 with an external device, the capacitor 207 supplies power to the LAN interface circuit 233 until the communication is completed to prevent data loss due to an interruption of the communication.

The HDD control unit 202 functions as an application database that stores therein an application program, information for invoking a printer and an image forming processor, and the like. The HDD control unit 202 also functions as an image database that stores therein image data including scanned image data, image data to be written, and text data. If a power cut occurs while such data is being stored in an HDD, the capacitor 207 also supplies power to the HDD control unit 202 until necessary data is stored in the HDD to prevent data loss.

As one of peripheral circuits of the control unit 203, the power-supply unit further includes a fixing heater (AC fixing heater) 212 for heating a fixing device. The temperature sensing element 213 detects a surface temperature of a fixing roller heated by the fixing heater 212 by using a thermistor. The fixing heater 212 is connected to a temperature control circuit 211. The temperature control circuit 211 detects a surface temperature of the fixing roller through the temperature sensing element 213, and controls power supply to the fixing heater 212 to maintain the surface temperature constant.

Described below is how to increase power supply to the fixing heater 212 by using power stored in the capacitor bank 207b. The voltage across the capacitor bank 207b drops when the capacitor bank 207b discharges. To cope with this, the constant-voltage generating circuit 209 generates a constant voltage. The output of the constant-voltage generating circuit 209 is input to a switching circuit 210 that switches power sources between the commercial power supply 201 via the DC/DC converter 205 and that from the capacitor 207 via the constant-voltage generating circuit 209. While, according to the third embodiment, relays 210a and 210b form the switching circuit 210, the switching circuit 210 can be a transistor including FET, and the like. The relays 210a and 210b are open and closed by a switching-circuit driving circuit 221. The control unit 203 controls the switching-circuit driving circuit 221.

The output of the DC/DC converter 205 is supplied to the second load circuit 216 that needs high power (e.g., driving load) through the relay 210a and the diode D6. On the other hand, the output of the constant-voltage generating circuit 209 is supplied to the second load circuit 216 through the relay 210b and the diode D7.

If the temperature of the fixing heater 212 drops to a level where an image may remain unfixed during serial copying, the CPU 203b outputs, to the temperature control circuit 211, a signal to close the relay 210b and then a signal to open the relay 210a. Upon opening of the relay 210a, available AC power is supplied to the fixing heater 212, which prevents a temperature drop during serial copying.

The CPU 203b also outputs, to the temperature control circuit 211, a signal to close the relay 210b and then a signal to open the relay 210a at the warm-up period of the fixing device such as when the image forming apparatus is turned on. Upon opening of the relay 210a, available AC power is supplied to the fixing heater 212, which reduces the warm-up period of the fixing device.

The voltage-drop detecting circuit 222 detects a voltage drop in the commercial power supply 201 to the lowest limit of the range that does not cause malfunction of the control unit 203. Generally, image forming apparatuses are designed so as to operate without problem even if there is a variation of about ±10% in the commercial power supply. Therefore, the voltage-drop detecting circuit 222 outputs a voltage-drop signal upon detecting a voltage drop to less than that of −10% of the commercial power supply 201.

The voltage-drop detecting circuit 222 includes a comparator 222a of the open-collector type, a Zener diode 222b, and resistors R1, R3, and R4. The resistors R3 and R4, which constitute a voltage-divider circuit, are supplied with the output of the full-wave rectifying circuit 230. The voltage divided by the resistors R3 and R4 is fed to the plus terminal of the comparator 222a. On the other hand, the voltage of the Zener diode 222b, which is connected in series to the resistor R1, is fed to the minus terminal of the comparator 222a. Accordingly, while the voltage of the minus terminal is constant if the voltage of the full-wave rectifying circuit 230 drops, the voltage of the plus terminal drops in proportion to voltage drop of the commercial power supply 201.

The comparator 222a outputs a signal 0 (low) while the output of the full-wave rectifying circuit 230 is within a range of normal voltages. On the other hand, when the output of the full-wave rectifying circuit 230 drops to a predetermined voltage (the voltage of the Zener diode 222b) or less, the comparator 222a outputs a signal 1 (high).

The open-close circuit 218 is used for power supply at the time of a power cut, and includes a transistor 218a. The power switching circuit 223 includes transistors 223a and 223b.

When the comparator 222a outputs a signal 0 (low), the transistor 223a is turned off, and accordingly, the transistor 218a is turned off. On the other hand, when the comparator 222a outputs a signal 1 (High) and the transistor 223b is OFF, the transistor 223a is ON. Accordingly, the transistor 218a is ON. Thus, the output of the constant-voltage generating circuit 209 is supplied via the transistor 218a to the third load circuit 217 that is supplied with power at the time of interruption of power from the commercial power supply 201. The third load circuit 217 includes a driving load 217a, a constant-voltage power supply circuit 220, and a load. Examples of the driving load 217a include a motor of a scanner control unit and a conveyance motor to eject a sheet in the process of an image forming operation. The constant-voltage power supply circuit 220 generates a voltage for control circuits that are supplied with power at the time of interruption of power from the commercial power supply 201.

The third load circuit 217 is also supplied with the output of the DC/DC converter 205 via the diode D1, and operates with higher one of the output voltage of the DC/DC converter 205 and that of the constant-voltage generating circuit 209. Specifically, when the output voltage of the DC/DC converter 205 drops to less than that of the constant-voltage generating circuit 209, power sources are automatically switched from the output of the DC/DC converter 205 to that of the constant-voltage generating circuit 209 (the capacitor 207). Incidentally, the CPU 203b outputs in advance a signal for turning off the transistor 223b when the image forming apparatus is turned on.

The power-cut detecting circuit 204 detects that the voltage of the commercial power supply 201 drops to a level where the control unit 203 may malfunction. According to the third embodiment, a power cut is detected by using a zero-cross signal.

While the commercial power supply 201 supplies power normally, a zero-cross signal is input to an interrupt terminal (not shown) of the CPU 203b. For example, when the commercial power supply 201 supplies power at a frequency of 50 hertz, an interrupt occurs every 10 milliseconds. If a power cut occurs or the voltage of the commercial power supply 201 drops, no zero-cross signal is input to the interrupt terminal. Accordingly, no interrupt occurs.

Described below is the operation of the image forming apparatus when a power cut occurs. Upon detection of loss of a zero-cross signal, the CPU 203b determines that a power cut is detected, and performs interrupt processing. If the image forming apparatus is in standby mode, i.e., the image forming apparatus is not performing any operation, data transmission or reception via a network, and writing of data to the HDD, the CPU 203b outputs a signal 1 (high) to the power switching circuit 223. Thus, the transistors 223a and 218a are turned off to stop power supply from the capacitor 207.

When the image forming apparatus is performing an image forming operation, the CPU 203b ejects, to a first eject tray, a sheet that carries an image formed thereon and has passed through the fixing device, if any. The CPU 203b also ejects, to a second eject tray, a sheet on which an image is yet to be formed, if any. The CPU 203b then stores necessary information in a memory (MEM) 234, and controls driving mechanisms to stop at a safe position. This is because if power supply is interrupted while a driving mechanism, e.g., an optical scanner, is returning to its home position after scanning an image, the optical scanner, which has become out of control, bumps into a guide member and may be broken. Such an event can be prevented by stopping power supply from the capacitor 207 after the optical scanner arrives at its home position.

The CPU 203B checks whether the image forming apparatus is transmitting or receiving data via a network. When the image forming apparatus is transmitting or receiving data, the CPU 203B allows to complete the data transmission or reception. The CPU 203B then checks whether data is being written to the HDD. When data is being written to the HDD, the CPU 203B allows to complete the writing of the data. After performing the series of the operations, the CPU 203B outputs a signal 1 (high) to the power switching circuit 223. Accordingly, the transistor 223b is turned on, and the transistors 223a and 218a are turned off. As a result, the capacitor 207 stops power supply. This prevents data loss, damage of equipment, and the like. This operation flow is basically similar to that described previously in connection with FIG. 5, and the detail thereof is not repeated. Incidentally, if the capacitor 207 has a large capacity and stores therein a large amount of charge, power supply from the capacitor 207 can be stopped after completion of an image forming operation in process.

The DC/DC converter 205 normally generates power for the control circuits, the driving circuits, and the driving-power supply unless a power cut occurs. The voltage for the control circuits is supplied from the DC/DC converter 205 to the specific circuit 203a and the third load circuit 217 through the control unit 203, the first load circuit 214, and the diode D1.

A voltage output from the constant-voltage generating circuit 209 is fed to the constant-voltage power supply circuit 220. The voltage is then supplied via the third load circuit 217 and a diode D9 to the memory 234, the HDD control unit 202 and the LAN interface circuit 233.

Figure 14:
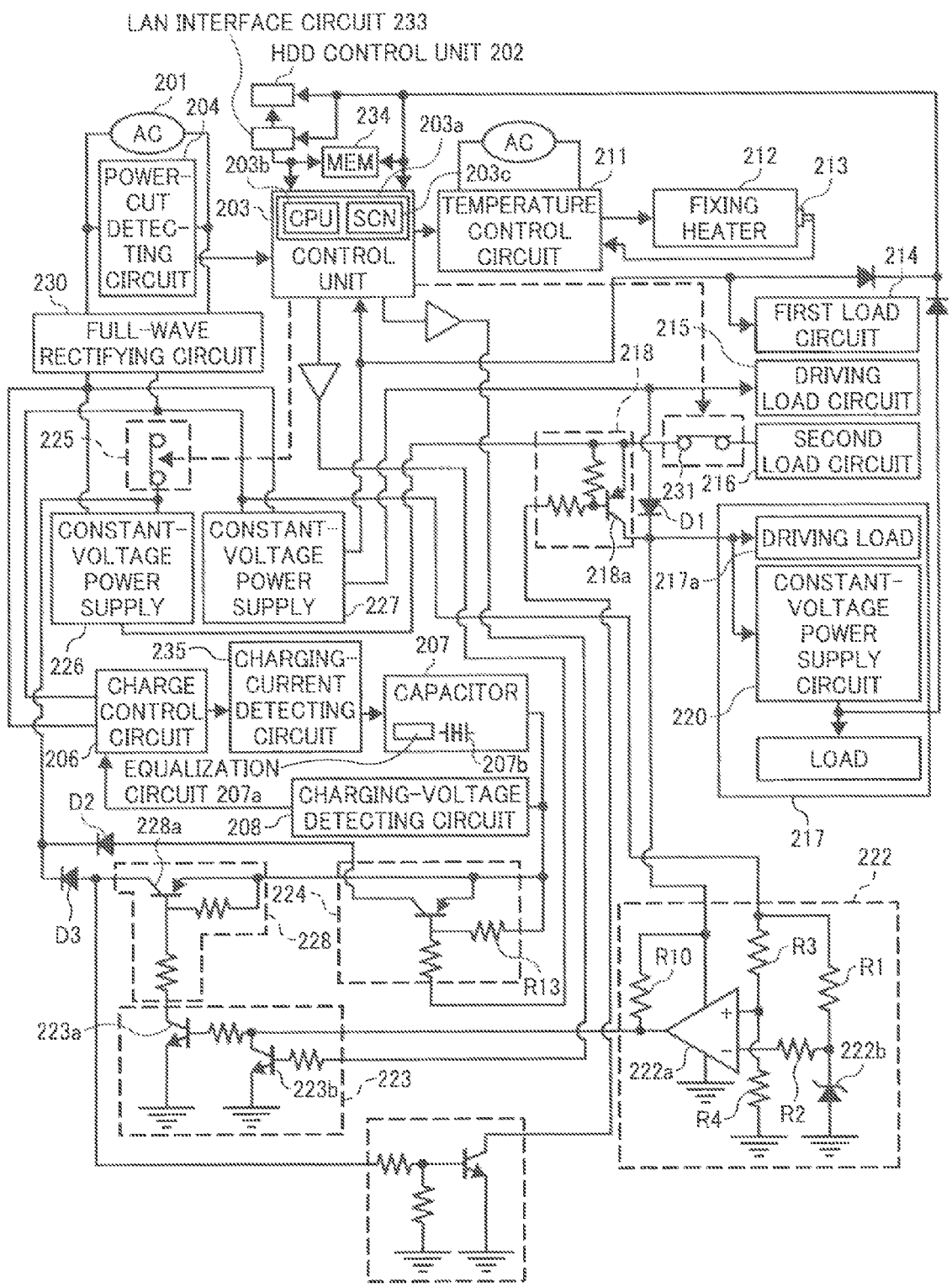
FIG. 14 is a schematic diagram of a power-supply unit according to a fourth embodiment of the present invention.

FIG. 14 is a schematic diagram of a power-supply unit according to a fourth embodiment of the present invention. A case where the power-supply unit shown in FIG. 14 is used in an image forming apparatus is explained below; however, the power-supply unit can be used in devices other than image forming apparatuses with some or no modification. The power-supply unit detects a voltage drop and an interruption, both temporary and sustained, in commercial power supply, and, upon detection of such an event, supplies power stored in a capacitor to a specific load. The power-supply unit shown in FIG. 14 is basically similar to that of FIG. 13 except for the presence of constant-voltage power supplies 226 and 227.

As described in the third embodiment in connection with FIG. 13, the charge control circuit 206 charges the capacitor 207 (the capacitor bank 207b). The power stored in the capacitor 207 is supplied to the constant-voltage power supply 226 through the diode D6 and a switching circuit 224 that switches the power source to the capacitor 207. The power is then is supplied to the second load circuit 216 through an open-close circuit 231 that is used for supplying power to loads.

If the temperature of the fixing heater 212 drops to a level where an image may remain unfixed during serial copying, the CPU 203b opens a switching circuit 225 that switches the power source to the commercial power supply 201. The CPU 203b then closes the open-close circuit 231. Upon opening of the switching circuit 225, available AC power is supplied to the fixing heater 212, which prevents a temperature drop during serial copying.

The CPU 203b also opens the switching circuit 225, and then closes the open-close circuit 231 at the warm-up period of the fixing device such as when the image forming apparatus is turned on. Upon opening of the switching circuit 225, available AC power is supplied to the fixing heater 212, which reduces the warm-up period of the fixing device.

When power supply from the capacitor bank 207b is not necessary, the CPU 203b opens the switching circuit 224, and closes the switching circuit 225 and the open-close circuit 231. The constant-voltage power supply 226 generates a constant voltage to be supplied to the second load circuit 216 through the open-close circuit 231.

The comparator 222a outputs a signal 0 (low) while the output of the full-wave rectifying circuit 230 is within a range of normal voltages. On the other hand, when the output of the full-wave rectifying circuit 230 drops to a predetermined voltage (the voltage of the Zener diode 222b) or less, the comparator 222a outputs a signal 1 (high).

When the comparator 222a outputs a signal 0 (low), i.e., when the output of the full-wave rectifying circuit 230 is within a range of normal voltages, the transistor 223a is turned off. Accordingly, a transistor 228a of a switching circuit 228, which switches the power source to the capacitor 207, is also turned off. Thus, power is not supplied from the capacitor bank 207b to the constant-voltage power supply 226.

On the other hand, when the comparator 222a outputs a signal 1 (High), i.e., when the output voltage of the full-wave rectifying circuit 230 drops, and the transistor 223b is OFF, and the transistor 223a is ON. Accordingly, the transistor 228a is ON. Thus, power is supplied from the capacitor bank 207b to the constant-voltage power supply 226 via the diode D3.

When the power is supplied to the constant-voltage power supply 226, the transistor 218a is turned on. Thus, power is supplied from the constant-voltage power supply 226 to the third load circuit 217.

The third load circuit 217 is also supplied with the output of the constant-voltage power supply 227 via the diode D1, and operates with higher one of the output voltage of the constant-voltage power supplies 226 and 227. Specifically, when the output voltage of the constant-voltage power supply 226 drops to less than that of the constant-voltage power supply 227, the power sources is automatically switched to output of the constant-voltage power supply 227 (the capacitor 207). Incidentally, the CPU 203b outputs in advance a signal for turning off the transistor 223b when the image forming apparatus is turned on.

Figure 15:
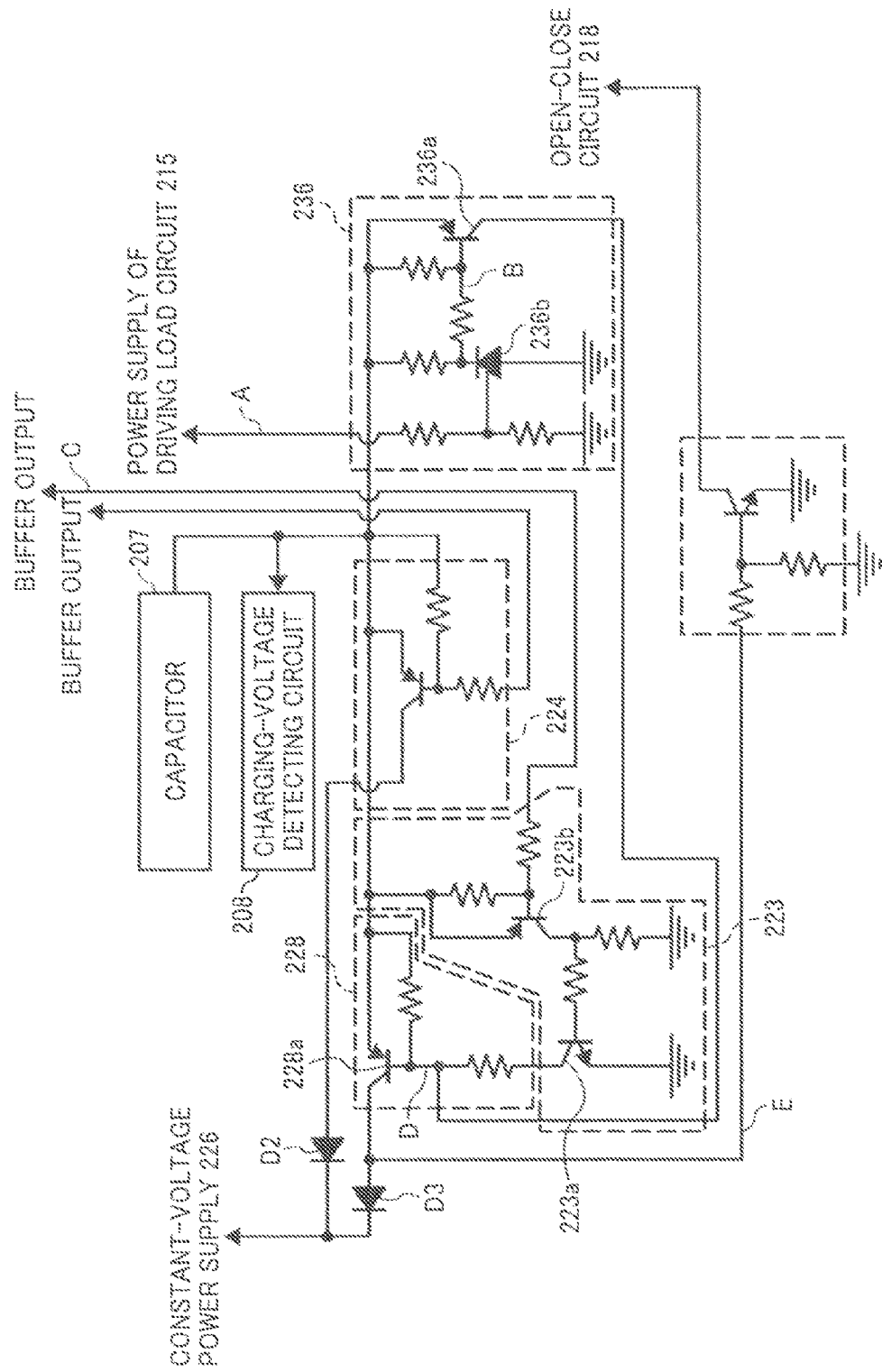
FIG. 15 is another example of circuitry of a voltage-drop detecting circuit to supply power from a capacitor of the power-supply unit shown in FIG. 14.

FIG. 15 is another example of circuitry for detecting a voltage drop and supplying power from the capacitor 207 to the constant-voltage power supply 226.

A voltage-drop detecting circuit 236 shown in FIG. 15 includes a shunt regulator 236b. The voltage-drop detecting circuit 236 detects a voltage drop by using, as a reference voltage, a high voltage supplied to the driving loads shown in FIG. 14. The image forming apparatus has a tolerance to about ±10% of variation in the reference voltage, and therefore, the voltage-drop detecting circuit 236 operates when voltage drops to less than that of −10% of the reference voltage.

While the reference voltage is normal, the shunt regulator 236b is ON, and accordingly, a transistor 236a is ON. When the transistor 236a is turned on, the transistor 228a is turned off. When the transistor 228a is turned off, power is not supplied from the capacitor bank 207b to the constant-voltage power supply 226.

Upon detection of a drop in the reference voltage, the shunt regulator 236b is turned off, and the transistor 236a is turned off. The CPU 203b outputs in advance a signal for turning on the transistor 223b when the image forming apparatus is turned on. With this, the transistor 228a is turned on. When the transistor 228a is turned on, power is supplied from the capacitor bank 207b to the constant-voltage power supply 226. Incidentally, a voltage waveform at points A, B, C, D, and E is basically the same as previously described in connection with FIG. 7, and the same description is not repeated here.

Figure 16:
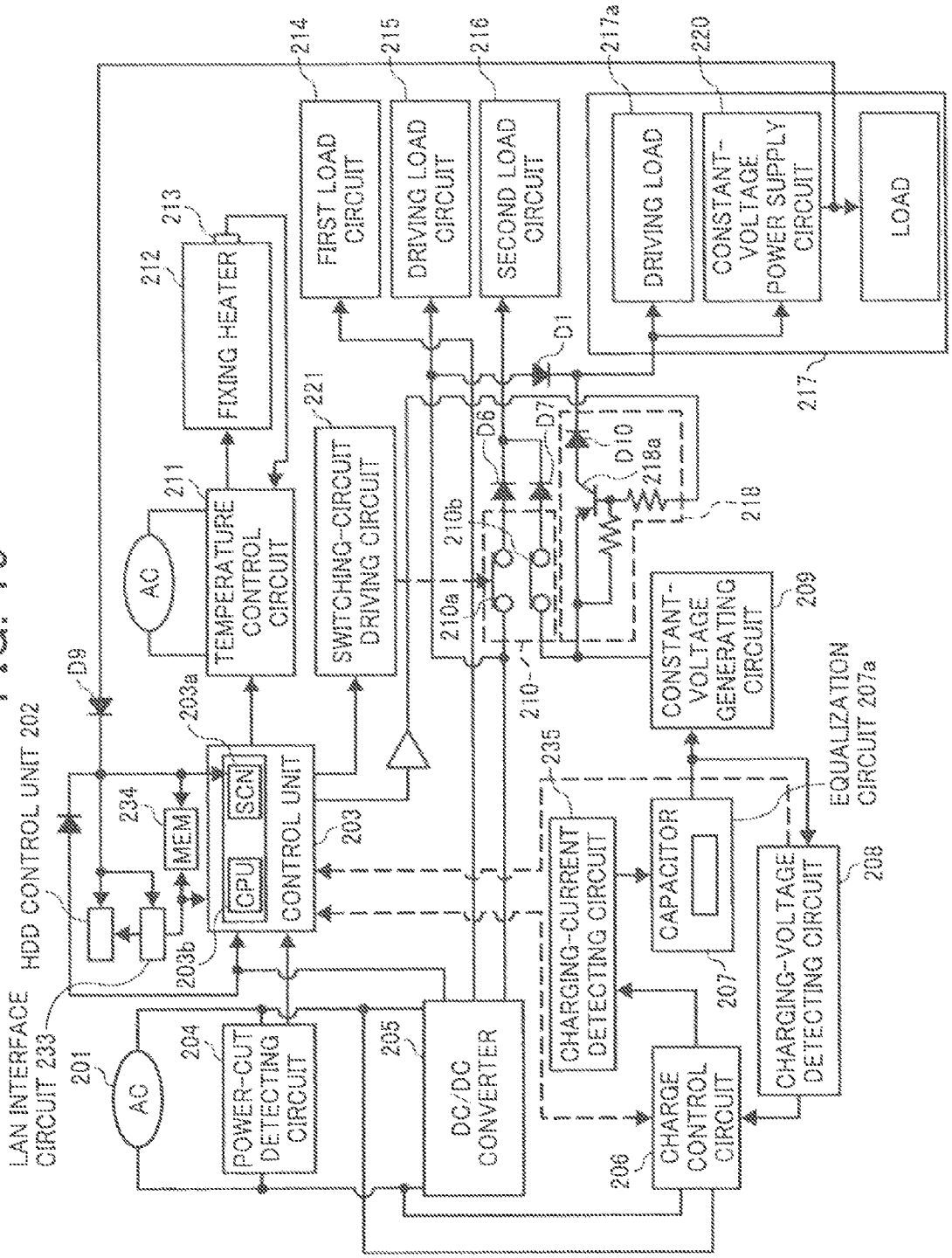
FIG. 16 is a schematic diagram of a power-supply unit according to a fifth embodiment of the present invention.

FIG. 16 is a schematic diagram of a power-supply unit according to a fifth embodiment of the present invention. A case where the power-supply unit shown in FIG. 16 is used in an image forming apparatus is explained below; however, the power-supply unit can be used in devices other than image forming apparatuses with some or no modification. The power-supply unit detects a voltage drop and an interruption, both temporary and sustained, in commercial power supply, and, upon detection of such an event, supplies power stored in a capacitor to a specific load. The power-supply unit shown in FIG. 16 is basically similar to that of FIG. 13 except that a constant voltage is generated based on power supplied from the commercial power supply 201, or based on power supplied from the capacitor 207.

When the output voltage of the DC/DC converter 205 drops to less than that of the constant-voltage generating circuit 209 due to a voltage drop and an interruption of the commercial power supply 201, power is automatically supplied from the constant-voltage generating circuit 209 (the capacitor 207) via the transistor 218a and the diode D1. The CPU 203b outputs a signal for turning off the transistor 218a after a series of the operations performed at the time of a power cut to stop the power supply from the capacitor 207.

As described above, in the fifth embodiment, upon detection of a voltage drop and an interruption, both temporary and sustained, in commercial power supply, power is automatically supplied from an auxiliary power supply. Thereafter, when it is determined that a power cut has occurred, the image forming apparatus enters power-cut mode. Thus, the image forming apparatus can operates without problem even during a temporary interruption or voltage drop of commercial power supply as well as a power cut, which improves the reliability of the image forming apparatus.

Figure 17:
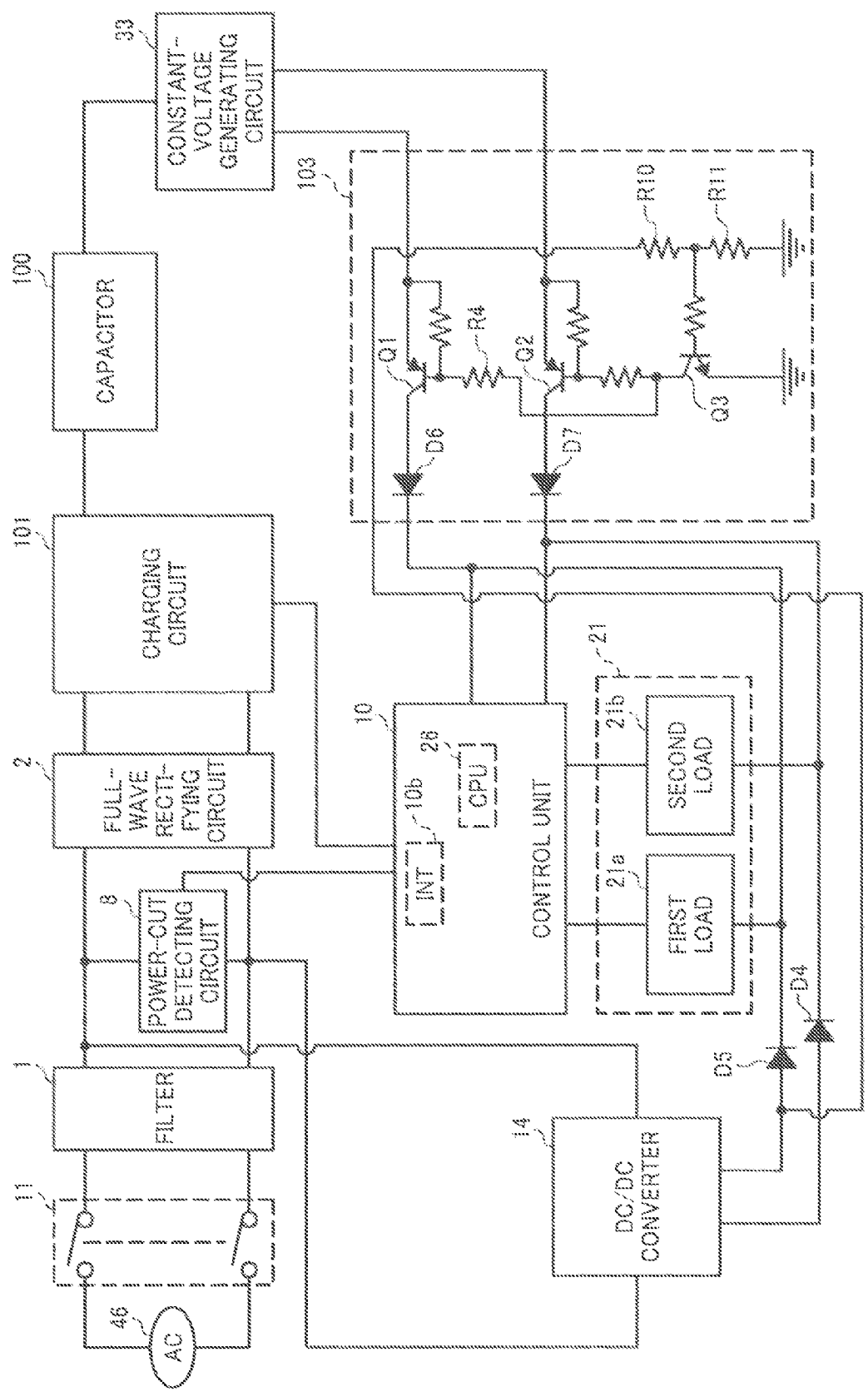
FIG. 17 is a schematic diagram of a power-supply unit according to a sixth embodiment of the present invention.

FIG. 17 is a schematic diagram of a power-supply unit according to a sixth embodiment of the present invention. A case where the power-supply unit shown in FIG. 17 is used in an image forming apparatus is explained below; however, the power-supply unit can be used in devices other than image forming apparatuses with some or no modification. The power-supply unit shown in FIG. 17 is basically similar to those described in the above embodiments except for the presence of a capacitor-power supply circuit 103 in place of the voltage-drop detecting circuit.

Upon occurrence of a temporary interruption or voltage drop of the commercial power supply 46, or a power cut, the power-supply unit of the sixth embodiment supplies power from the capacitor 100 to the first load circuit 21 and the control unit 10 independently of the control of the control unit 10. The power-supply unit also stabilizes voltage output from the DC/DC converter 14 and power stored in the capacitor 100, so that the output voltage of the constant-voltage generating circuit 33 can always be available for power supply to the first load circuit 21 and the control unit 10.

The power-supply unit includes the main power switch 11, the filter 1, the power-cut detecting circuit 8, the full-wave rectifying circuit 2, the charging circuit 101, the capacitor 100, the constant-voltage generating circuit 33, the control unit 10, the DC/DC converter 14, the first load circuit 21, and the capacitor-power supply circuit 103. Apart from the capacitor-power supply circuit 103, these circuits are of basically the same configuration, and operate in the same manner as previously described, and the same description is not repeated.

The capacitor-power supply circuit 103 supplies power output via the constant-voltage generating circuit 33 from the capacitor 100 to the first load circuit 21 and the control unit 10 when the output voltage of the DC/DC converter 14 is lower than that of the constant-voltage generating circuit 33.

Described below is the operation of the power-supply unit. First, the DC/DC converter 14 converts power supplied from the commercial power supply 46 to constant voltage. The constant voltage is supplied via the diode D5 to the first load 21a that does not need high power and the control unit 10. The constant voltage is also supplied via the diode D4 to the second load 21b that needs relatively high power including driving loads such as a motor, a solenoid, and a clutch.

The constant-voltage generating circuit 33 stabilizes power supplied from the capacitor 100, and outputs it. Specifically, the constant-voltage generating circuit 33 generates power to be supplied to the first load 21a and the control unit 10, and power that is available for power supply to the second load 21b. Power generated by the constant-voltage generating circuit 33 is fed to the transistor Q1 of the capacitor-power supply circuit 103. The output voltage of the constant-voltage generating circuit 33 is fed to the transistor Q2.

When the DC/DC converter 14 outputs a voltage in response to power supply from the commercial power supply 46, the power supply voltage to be supplied to the first load 21a and the control unit 10 is detected by a voltage-divider circuit formed of the resistor R10 and a resistor R11. The voltage detected by the voltage-divider circuit is fed to the transistor Q3, which turns on the transistor Q3. When the transistor Q3 is turned on, the transistors Q1 and Q2 are also turned on. As a result, the output of the transistor Q1 becomes available for power supply to the first load 21a and the control unit 10 via the diode D6. On the other hand, the output of the ON transistor Q2 becomes available for power supply to the second load 21b via the diode D7. Thus, when the output voltage of the DC/DC converter 14 drops to less than that of the capacitor 100, power is supplied from the capacitor 100 to the first load 21a, the second load 21b, and the control unit 10.

When the main power switch 11 is turned off, and the DC/DC converter 14 outputs no voltage, the voltage-divider circuit detects no voltage. Accordingly, the transistor Q3 is turned off. When the transistor Q3 is turned off, the transistors Q1 and Q2 are also turned off. This stops power supply from the capacitor 100. That is, when the main power switch 11 is OFF, power is not supplied from the capacitor 100, resulting in preventing unnecessary discharge from the capacitor 100.

The voltage output via the diodes D6 and D7 from the constant-voltage generating circuit 33 is preset to a value at which the image forming apparatus can operate normally, and which is lower than that output via the diodes D4 and D5 from the DC/DC converter 14.

As described above, in the sixth embodiment, a voltage that is lower than the output voltage of the DC/DC converter 14 can be available for power supply from the constant-voltage generating circuit 33 while the main power switch 11 is ON and the DC/DC converter 14 is outputting a voltage. When the output voltage of the DC/DC converter 14 drops to less than that of the constant-voltage generating circuit 33 due to an interruption or a voltage drop in the commercial power supply 46, power is automatically supplied from the constant-voltage generating circuit 33. Incidentally, while the power-supply unit includes the charging circuit 101 to charge the capacitor 100, the capacitor 100 can be charged by a voltage output from the DC/DC converter 14.

Figure 18:
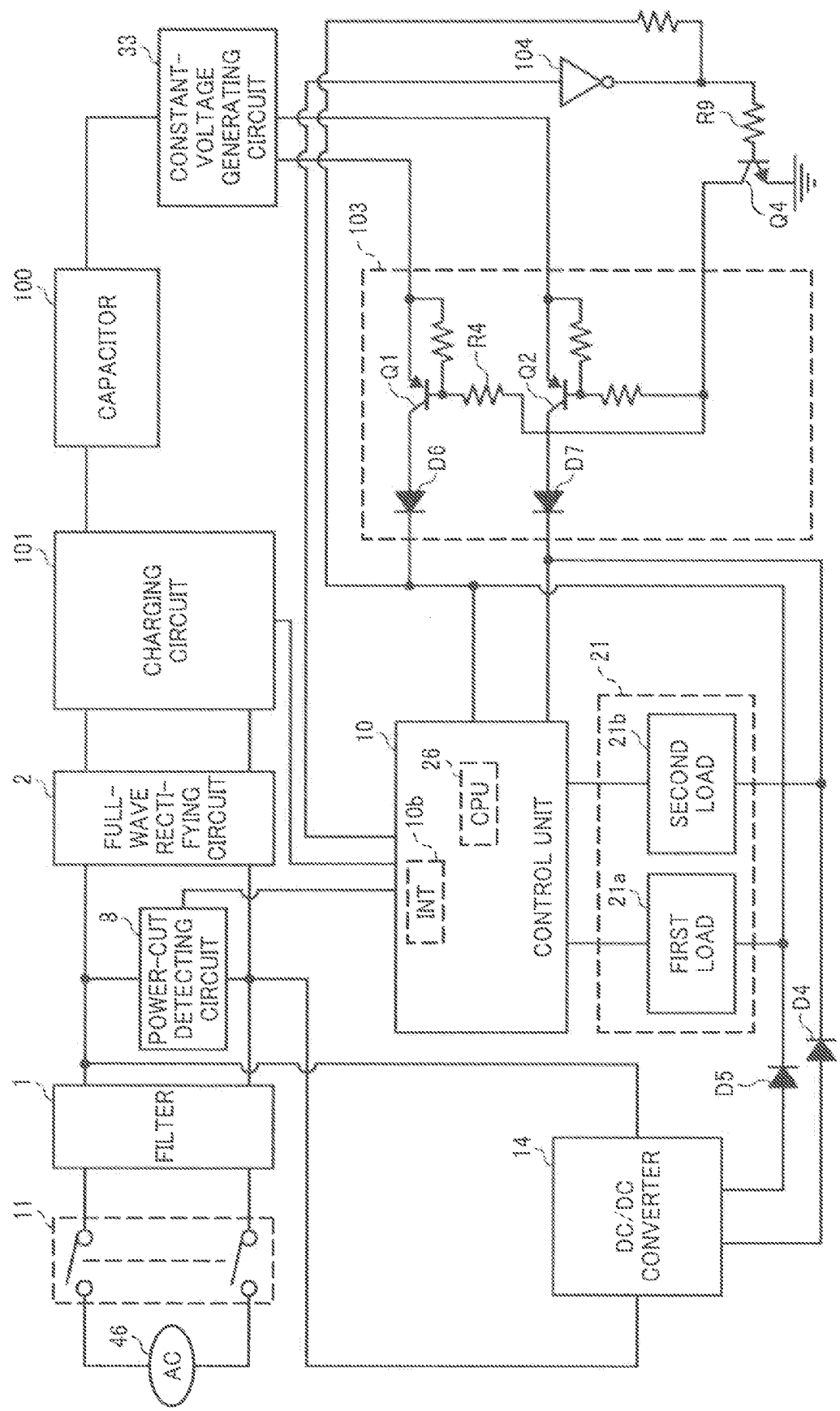
FIG. 18 is a schematic diagram of a power-supply unit according to a seventh embodiment of the present invention.

FIG. 18 is a schematic diagram of a power-supply unit according to a seventh embodiment of the present invention. A case where the power-supply unit shown in FIG. 18 is used in an image forming apparatus is explained below; however, the power-supply unit can be used in devices other than image forming apparatuses with some or no modification. The power-supply unit shown in FIG. 18 is basically similar to that of FIG. 17 except that it always supplies power from the capacitor 100 to the first load 21a and the control unit 10, and the same description is not repeated.

The power-supply unit of the seventh embodiment includes an inverter 104 of the open-collector type. The CPU 26 outputs a signal 0 (low) through the first port at the default setting when the main power switch 11 is turned on. In response to the signal 0 (low), the inverter 104 outputs a signal 1 (high). With this, the transistor Q4 is turned on, and the transistors Q1 and Q2 are also turned on. As a result, the output of the capacitor 100 can always be available for power supply to the first load circuit 21 and the control unit 10.

Upon completion of the operation in power-cut mode, i.e., the internal-interrupt processing shown in FIG. 5, the CPU 26 outputs a signal 1 (high) through the first port. In response to the output of the signal 1 (high), the transistor Q4 is turned off, and the transistors Q1 and Q2 are also turned off. As a result, power cannot be supplied from the capacitor 100.

A person skilled in the art will notice that the various features, elements, and structures of the first to seventh embodiments can be interchanged, rearranged, omitted, and combined in various different manners as desired.

The image forming apparatus can be a copier, a printer, a facsimile machine, and a multifunction product. Besides, the power-supply unit described in the above embodiments can be applied, apart from the image forming apparatus, to any apparatus including an auxiliary power supply that automatically supplies power when a voltage drop and an interruption, both temporary and sustained, occurs in commercial power supply.

As set forth hereinabove, according to an aspect of the present invention, an image forming apparatus can operate without problem even during a voltage drop and an interruption, both temporary and sustained, in external power supply, which improves the reliability of the image forming apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a capacitor that is charged by an external power source, and dischargably stores therein power;
a load that receives supply of power;
a control unit that controls the load;
a switching unit that switches power sources to supply power to the load and the control unit between the external power source and the capacitor;
a detecting unit that detects whether the voltage of the external power source has dropped below a first or second threshold level; and
a power supply unit that
causes the switching unit to switch the power source to supply power to the load and the control unit from the external power source to the capacitor when the detecting unit detects that the voltage of the external power source has dropped below the first threshold level, and supplies power to the load and the control unit, and
causes the capacitor to supply power to the load and the control unit before a voltage of the external power source drops below the second threshold level where malfunction of any one of the load and the control unit occurs, and stops the supply of power from the capacitor to the load and the control unit after the voltage exceeds the first threshold level.

2. The image forming apparatus according to claim 1, wherein the detecting unit detects whether the voltage of the external power source has dropped to a lowest value in a range of voltages that do not cause malfunction.

3. The image forming apparatus according to claim 2, wherein
the detecting unit detects whether the voltage of the external power source has risen to the first threshold level, and
the switching unit switches, when the detecting unit detects that the voltage of the external power source has risen to the first threshold level, the power sources from the capacitor to the external power source.

4. The image forming apparatus according to claim 1, further comprising an interruption detecting unit that detects an interruption of power supply from the external power source, wherein
the control unit controls, when the interruption detecting unit detects an interruption of power supply, the load to perform a predetermined process with the power supply from the capacitor, and
the power-supply unit stops the power supply from the capacitor after the load completes the predetermined process.

5. The image forming apparatus according to claim 4, further comprising a storage unit that stores therein data, wherein
the power-supply unit continues, when the interruption detecting unit detects an interruption of power supply during an image forming operation, the power supply from the capacitor until data related to the image forming operation is stored in the storage unit.

6. The image forming apparatus according to claim 4, further comprising a storage unit that stores therein data, wherein
the power-supply unit continues, when the interruption detecting unit detects an interruption of power supply while data is being received via a network, the power supply from the capacitor until the data is completely received and stored in the storage unit.

7. The image forming apparatus according to claim 4, wherein the power-supply unit continues, when the interruption detecting unit detects an interruption of power supply during an image forming operation, the power supply from the capacitor until a recording medium on which the image forming operation is performed is ejected.

8. The image forming apparatus according to claim 4, wherein the power-supply unit continues, when the interruption detecting unit detects an interruption of power supply while a driving unit is in operation, the power supply from the capacitor until the driving unit rests in a home position.

9. The image forming apparatus according to claim 4, wherein the power-supply unit continues, when the interruption detecting unit detects an interruption of power supply, the power supply from the capacitor for a predetermined period.

10. The image forming apparatus according to claim 1, further comprising:
    a first constant-voltage generating unit that converts voltage of power supplied from the external power source to first constant voltage, and outputs first-constant voltage power depending on the first constant voltage; and
    a second constant-voltage generating unit that converts voltage of power supplied form the capacitor to second constant voltage, and outputs second-constant voltage power depending on the second constant voltage, wherein
    the switching unit switches the power sources between the first constant-voltage power and the second constant-voltage power, and, when the detecting unit detects that the voltage of the external power source has dropped below the first threshold level, switches the power sources from the first constant-voltage power to the second constant-voltage power such that the power-supply unit supplies the second constant-voltage power to the load and the control unit.

11. The image forming apparatus according to claim 10, wherein the detecting unit detects whether the voltage of the external power source has dropped below the first threshold level based on any one of smoothed rectified voltage derived from the voltage of the external power source and the first constant voltage.

12. The image forming apparatus according to claim 1, further comprising:
    a constant-voltage generating unit that converts power supplied form any one of the external power source and the capacitor to constant-voltage power, wherein
    the switching unit switches power sources to supply power to the constant-voltage generating unit between the external power source and the capacitor, and, when the detecting unit detects that the voltage of the external power source has dropped below the first or second threshold levels, switches the power sources from the external power source to the capacitor such that the power-supply unit supplies power from the capacitor to the load and the control unit.

13. A power supply device for an image forming apparatus including a load that receives supply of power and a control unit that controls the load, the power supply device comprising:
    a capacitor that is charged by an external power source, and dischargably stores therein power;
    a switching unit that switches power sources, to supply power to the load and the control unit of the image forming apparatus, between the external power source and the capacitor; and
    a detecting unit that detects whether the voltage of the external power source has dropped below a first or second threshold level; and
    a power supply unit that
        causes the switching unit to switch the power source to supply power to the load and the control unit from the external power source to the capacitor when the detecting unit detects that the voltage of the external power source has dropped below the first threshold level, and supplies power to the load and the control unit, and
        causes the capacitor to supply power to the load and the control unit before a voltage of the external power source drops below the second threshold level where malfunction of any one of the load and the control unit occurs, and stops the supply of power from the capacitor to the load and the control unit after the voltage exceeds the first threshold level.

14. A power supply method of supplying power to an image forming apparatus, the apparatus including a load receiving supply of power and a control unit that controls the load, the power supply method comprising:
    charging a capacitor by an external power source;
    switching power sources, to supply power to the load and the control unit of the image forming apparatus, between the external power source and the capacitor;
    detecting whether the voltage of the external power source has dropped below a first or second threshold level;
    switching the supply power to the load and the control unit from the external power source to the capacitor when the detecting that the voltage of the external power source has dropped below the first threshold level, and
    switching the supply power to the load and the control unit from the external power source to the capacitor before a voltage of the external power source drops below the second threshold level where malfunction of any one of the load and the control unit occurs, and stopping the supply of power from the capacitor to the load and the control unit after the voltage exceeds the first threshold level.

* * * * *